United States Patent
Johnson et al.

(10) Patent No.: US 7,459,822 B1
(45) Date of Patent: Dec. 2, 2008

(54) ROTATING ELECTRIC MACHINE HAVING SWITCHED OR VARIABLE RELUCTANCE WITH FLUX TRANSVERSE TO THE AXIS OF ROTATION

(76) Inventors: Weston C. Johnson, 2220 W. Clinch Ave, Apt. A, Knoxville, TN (US) 37916; Richard M. Currie, 7655 Abbey Glen Dr., Cumming, GA (US) 30040

( * ) Notice: Subject to any disclaimer, the term of this patent is extended or adjusted under 35 U.S.C. 154(b) by 365 days.

(21) Appl. No.: 11/128,823

(22) Filed: May 13, 2005

(51) Int. Cl.
*H02K 16/04* (2006.01)
*H02K 37/04* (2006.01)
*H02K 37/08* (2006.01)
*H02K 19/10* (2006.01)

(52) U.S. Cl. .................. 310/166; 310/266; 310/268; 310/168; 310/49 R

(58) Field of Classification Search .......... 310/166, 310/168, 216, 259, 266, 268, 254, 114, 49 R
See application file for complete search history.

(56) References Cited

U.S. PATENT DOCUMENTS

| | | | | |
|---|---|---|---|---|
| 3,392,293 A | * | 7/1968 | De Boo et al. ............ | 310/49 R |
| 3,783,319 A | * | 1/1974 | Yamamura et al. .......... | 310/268 |
| 3,784,850 A | * | 1/1974 | Inaba et al. ............... | 310/49 R |
| 3,803,431 A | * | 4/1974 | Inaba et al. ............... | 310/49 R |
| 4,639,626 A | * | 1/1987 | McGee ..................... | 310/155 |
| 6,359,360 B1 | * | 3/2002 | Lungu ...................... | 310/168 |
| 6,700,272 B1 | | 3/2004 | Lindner .................... | 310/166 |
| 2002/0125783 A1 | | 9/2002 | Morinigo ................... | 310/179 |
| 2004/0150289 A1 | | 8/2004 | James ....................... | 310/261 |

OTHER PUBLICATIONS

Switched Reluctance Motor Drives, http://www.fleadh.co.uk/srm.htm, Printed: Apr. 25, 2005.

* cited by examiner

*Primary Examiner*—Karl I Tamai
(74) *Attorney, Agent, or Firm*—Luedeka, Neely & Graham, P.C.

(57) ABSTRACT

An electric machine, such as a switched reluctance motor (SRM), having one or more transverse flux axes is described. The rotor and stator of the electric machine have more than one phase, not necessarily of even number. Flux guidance regions within the stator are angularly and spatially located such that they may be transverse, or not coinciding with, the plane perpendicular to the axis of shaft rotation. The flux guidance regions are composed so as to contain a magnetic field whose flux is guided in either a loop or coupled configuration. In the loop configuration, multiple flux guidance paths that are able to operate simultaneously exist within each chuck arrangement. In the coupled configuration, a single primary flux guidance path exists within the chuck arrangement. Transverse flux guidance allows for the removal and replacement of stator windings without significant disassembly or removal of the motor.

21 Claims, 19 Drawing Sheets

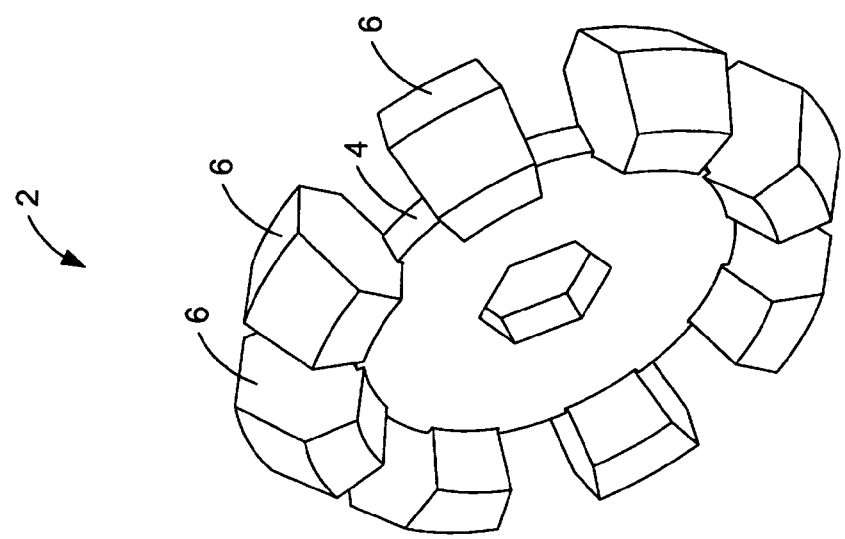
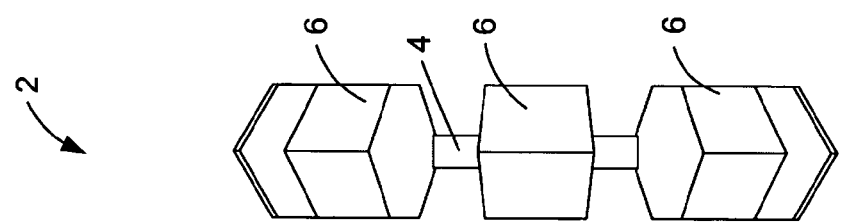
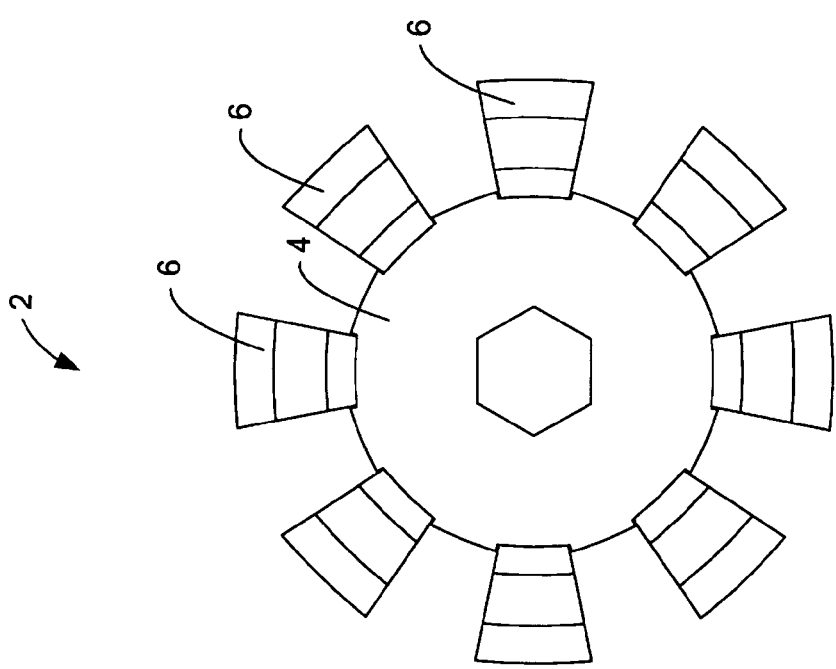
FIG. 1C
FIG. 1B
FIG. 1A

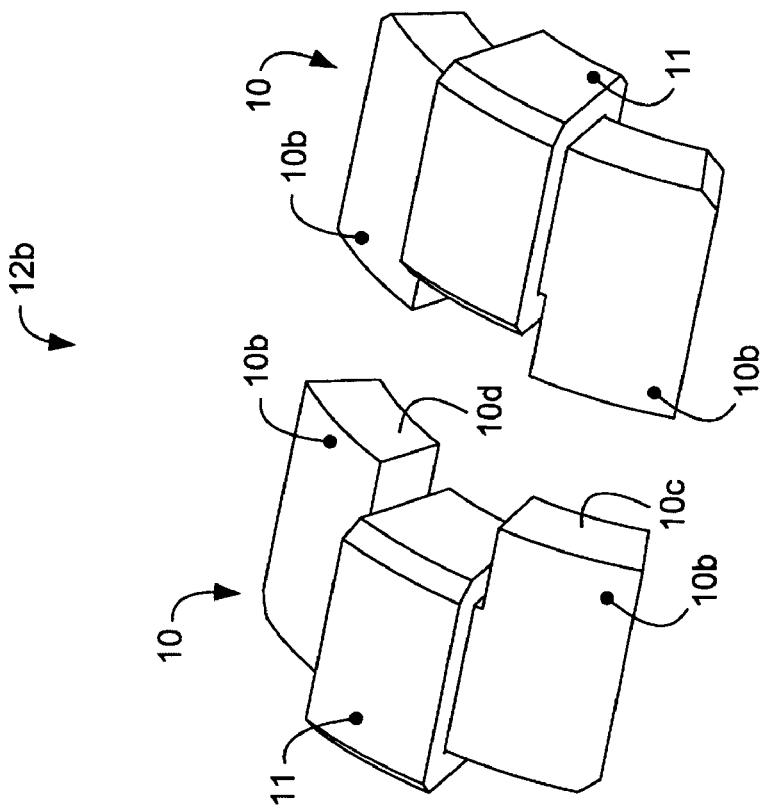
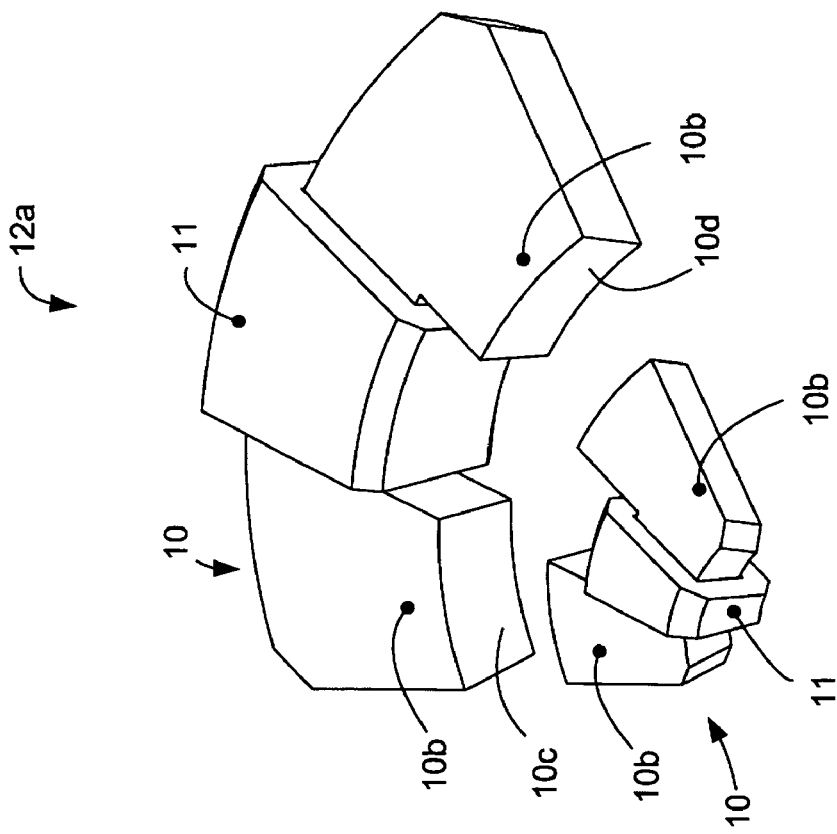
FIG. 3A
FIG. 3B

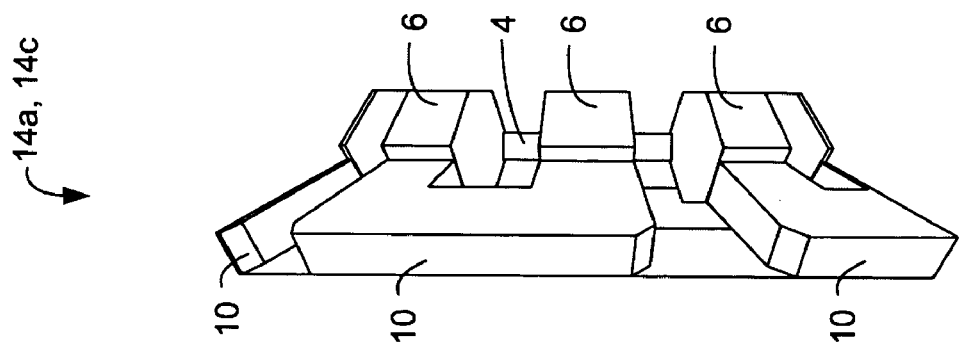
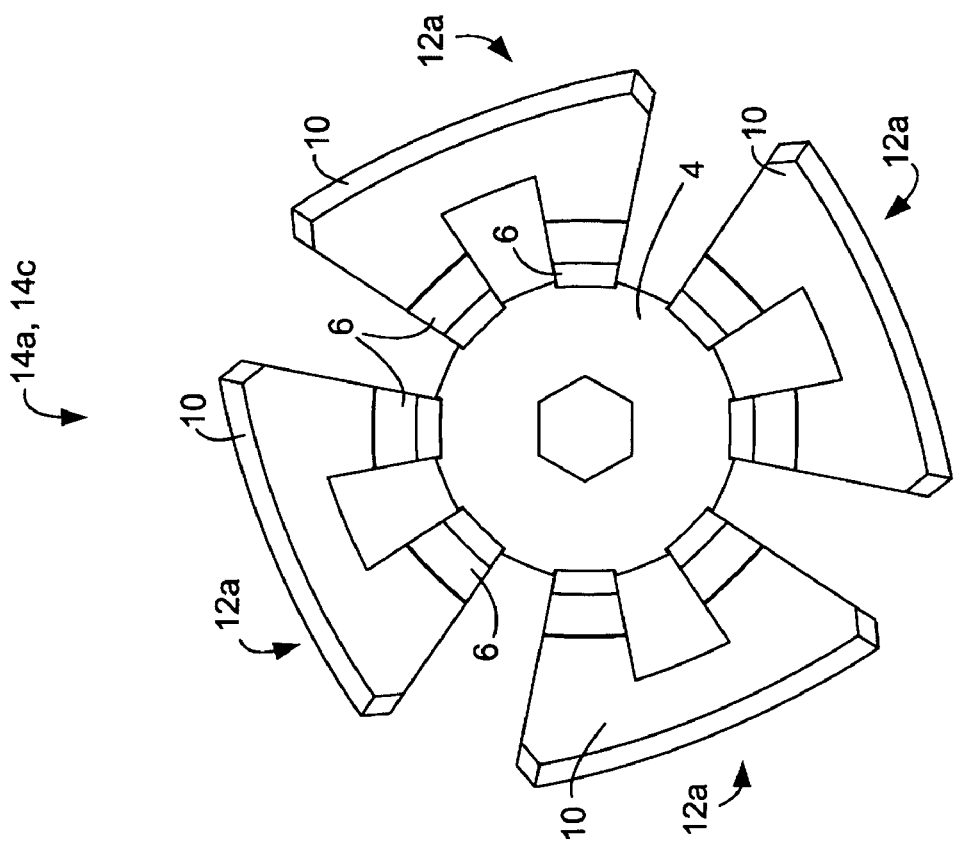

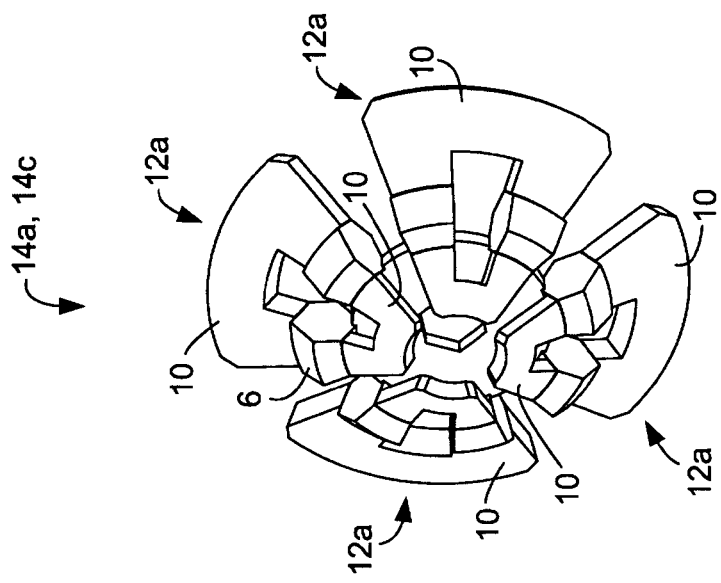
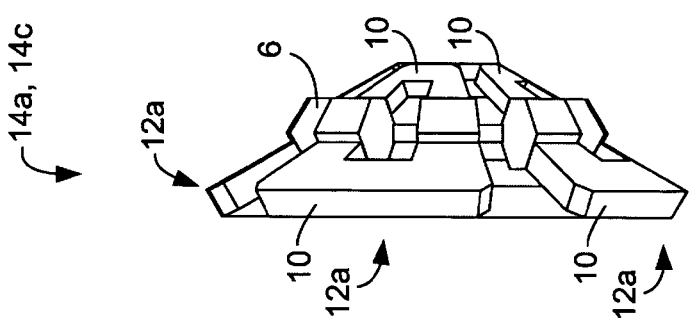
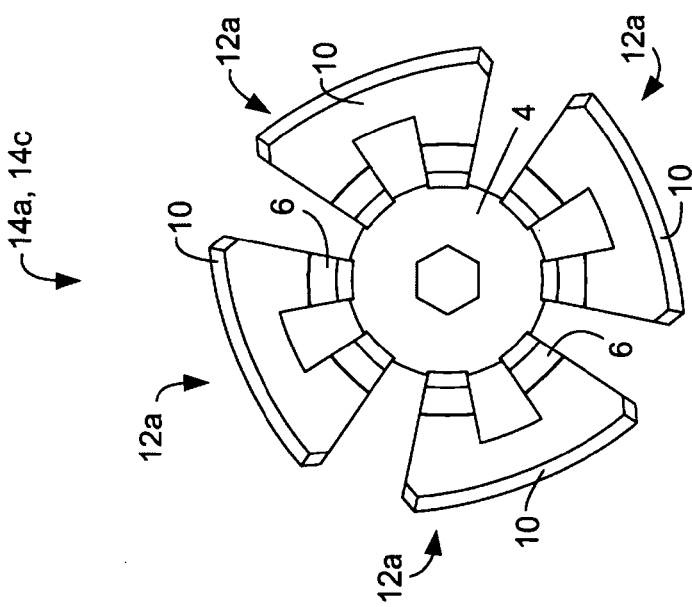
FIG. 6C
FIG. 6B
FIG. 6A

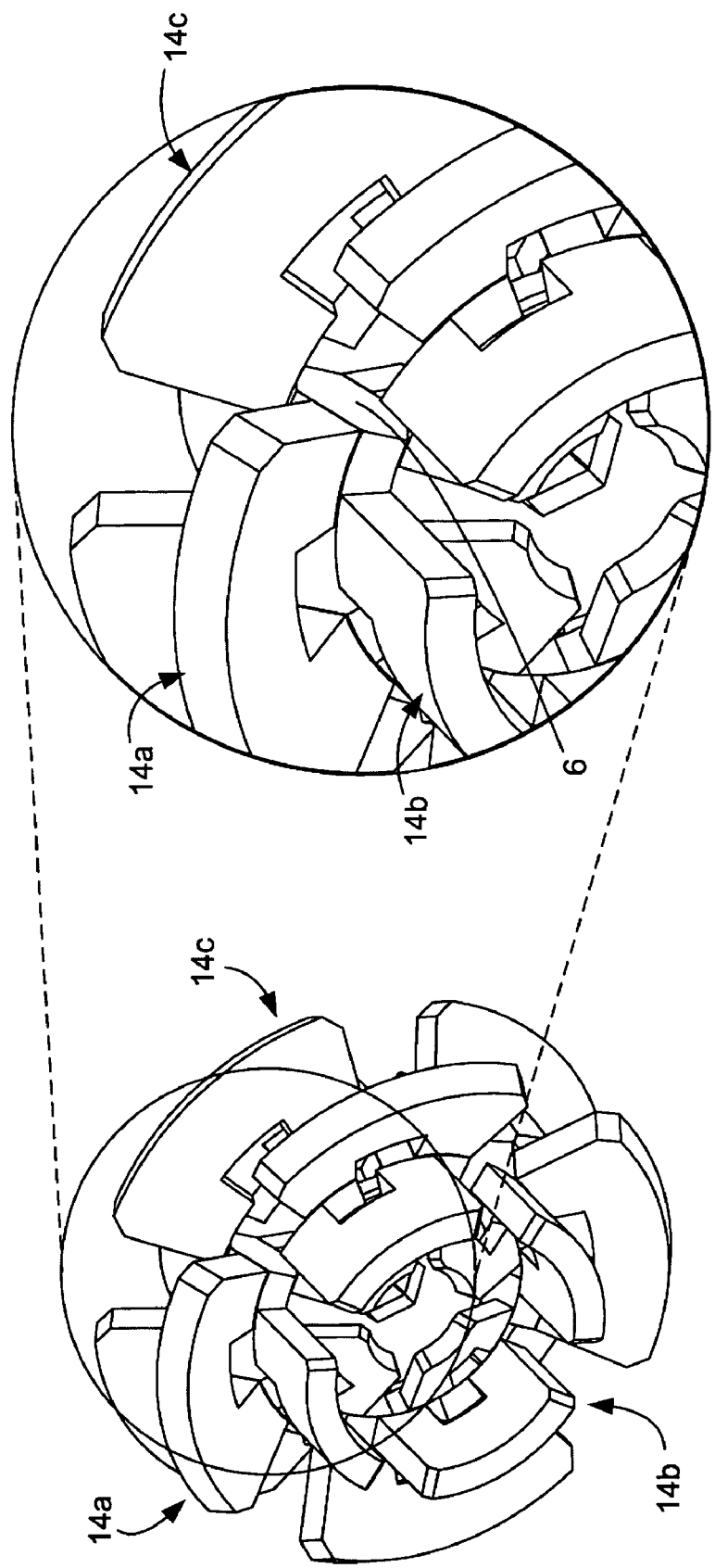

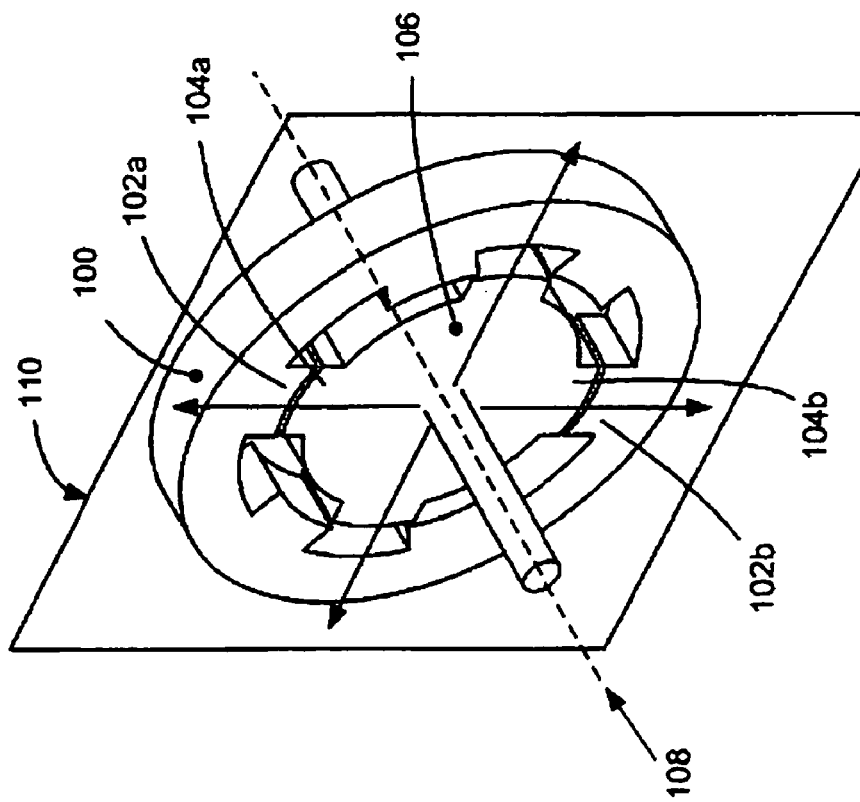
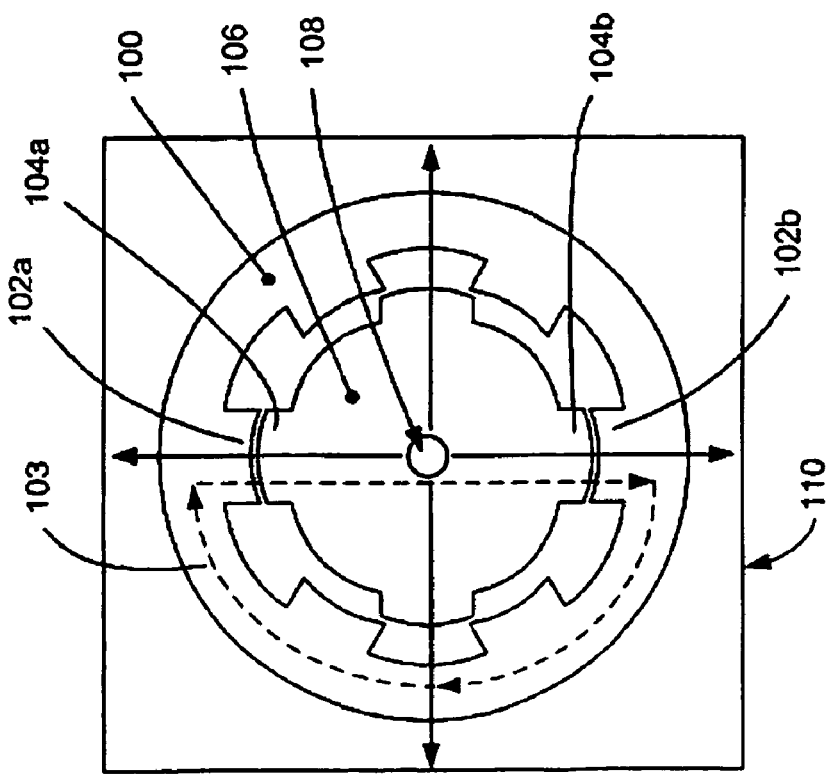

ROTATING ELECTRIC MACHINE HAVING SWITCHED OR VARIABLE RELUCTANCE WITH FLUX TRANSVERSE TO THE AXIS OF ROTATION

FIELD

This invention relates to the field of electric machines, including electric motors and generators. More particularly, this invention relates to switched and variable reluctance machines, such as a switched reluctance motor (SRM) or generator, or a variable reluctance motor (VRM) or generator, having one or more transverse flux axes.

BACKGROUND

The conventional switched reluctance motor has been around for well over a century. However, commercial viability and widespread utilization of the SRM has been hindered in recent decades for various reasons including poor control techniques, excessive audible noise, and large torque ripple. Despite these disadvantages, the SRM is of interest due its relatively simple construction and resulting lower cost when compared to other traditional electric motors. Because the traditional reluctance motor only has stator windings, the points of failure can only be the windings and shaft bearings. This provides for higher reliability. Additionally, with sufficient phase count the traditional SRM is able to function in the event of a phase failure as there is no flux linkage between phases to produce back-emf on the failed phase.

The traditional SRM topology, such as shown in FIGS. 17A and 17B, has changed little from its inception. Essentially, the conventional SRM consists of a stator 100 with salient teeth 102a-102b and current carrying windings (not shown) that are used to produce flux in a path that links through rotor teeth 104a-104b and a rotor yoke 106. The rotor yoke 106 and stator yoke 100 of the traditional SRM are additionally used for mechanical integrity and rigidity. The flux linkages generated between the stator and rotor of a traditional switched reluctance motor are designed to link primarily in plane(s) perpendicular to the axis 108 of shaft rotation and in the plane 110 of rotor rotation (i.e. radial gap motors). A similar process occurs for axial gap motors except that the flux linkages generated between the stator and rotor of the traditional SRM link primarily in paths parallel to the axis 108 of shaft rotation and perpendicular to the plane 110 of rotor rotation.

For example, as shown in FIGS. 17A and 17B, the primary flux path 103 of the traditional SRM is through the salient stator teeth 102a, salient rotor teeth 104a, the rotor yoke 106, an opposing salient rotor tooth 104b, an opposing salient stator tooth 102b, the stator yoke 100 and back through the originating stator tooth 102a. This flux path lies within a plane 110 that is perpendicular to the axis of shaft rotation.

A common variation to the reluctance motor design is the stacking of multiple reluctance motors, end to end, along a common shaft, at angular offsets so as to increase the magnitude of the generated torque and reduce torque ripple.

Numerous schemes for increasing the controllability of the traditional reluctance motor have been implemented. These schemes vary from innovative control algorithms to novel tooth designs. In one scheme described in U.S. Pat. No. 6,700,272, the motor runs at high speeds yet produces low shaft revolutions per minute (RPM). This allows for reduced torque ripple and results in a shaft RPM usable by most applications, thereby eliminating the need for a gearbox. This particular method has been accomplished through the introduction of differing flux guidance paths that result in a planetary gear effect between the rotor and stator. Despite this, the overall motor topology and planar torque production method is not different from that of the traditional SRM.

No known prior SRM design schemes have altered the fundamental design of the reluctance motor such that the path of the flux linkage through a rotor tooth is variable with position.

SUMMARY

The switched or variable reluctance motor of the present invention has a primary flux path passing through the center of a stator chuck, through a pole of the stator chuck, through a rotor tooth, through a complimentary stator chuck, through another rotor tooth, and finally through either the originating chuck pole or a different chuck pole. This flux path lies in planes that may be transverse to (not coinciding with) the plane that is perpendicular to the axis of shaft rotation. While this flux path may include the plane perpendicular to the axis of shaft rotation, this perpendicular plane is not the sole flux path plane. With such a flux path, the motor generates or consumes useful torque with increased use of the volume of the motor, providing for smaller motors and increased energy density.

The flux generated by the present invention links the angular positions of the chuck arrangements. Unlike in prior art SRM designs, the predominate flux flow in the present invention is not through the main rotor yoke or stator body. Instead, flux is predominately guided within the respective rotor teeth and stator chucks. In transferring the flux path and the resulting torque to a plane that is transverse to the axis of shaft rotation and independent of the respective yokes, the motor windings are made accessible for easy removal and replacement during motor maintenance.

A preferred embodiment of the invention provides an electric machine comprising a rotor assembly and one or more stator chuck arrangements disposed around and adjacent the rotor assembly. The rotor assembly includes a rotor hub and a plurality of rotor teeth. The rotor hub is disposed in a rotational plane that is substantially perpendicular to the rotational axis. The rotor teeth are affixed to the rotor hub and are disposed in a substantially circular path about the rotational axis. The rotor teeth include at least a first rotor tooth, a second rotor tooth and a third rotor tooth. Each stator chuck arrangement comprises multiple stator chuck sets including a first stator chuck set and a second stator chuck set. Each stator chuck set includes a first stator chuck and an opposing second stator chuck. The first and second stator chucks each have a first chuck pole, a second chuck pole and a chuck winding, where the first and second chuck poles are disposed adjacent the rotor teeth as the rotor assembly rotates about the rotational axis.

During operation of this preferred embodiment of the electric machine, a flux path passes from the first chuck pole of the first chuck of the first stator chuck set into the first rotor tooth, through the first rotor tooth and into the first chuck pole of the second stator chuck of the first stator chuck set. The flux path further passes from the first chuck pole of the second stator chuck of the first stator chuck set to the second chuck pole of the second stator chuck of the first stator chuck set, and from the second chuck pole of the second stator chuck of the first stator chuck set into the second rotor tooth.

During operation of one preferred embodiment, the flux path also passes through the second rotor tooth and into the second chuck pole of the first stator chuck of the first stator chuck set, and from the second chuck pole of the first stator chuck of the first stator chuck set to the first chuck pole of the first stator chuck of the first stator chuck set.

During operation of another preferred embodiment, the flux path also passes through the second rotor tooth and into the second chuck pole of a first stator chuck of the second stator chuck set, from the second chuck pole of the first stator chuck of the second stator chuck set to the first chuck pole of the first stator chuck of the second stator chuck set, and from the first chuck pole of the first stator chuck of the second stator chuck set into the third rotor tooth.

In some preferred embodiments, the stator chuck sets of one or more of the stator chuck arrangements are disposed in a substantially cylindrical relationship about the axis of rotation. In some embodiments, the stator chuck sets of one or more of the stator chuck arrangements are disposed in a substantially conical relationship about the axis of rotation.

In some embodiments, multiple-layer or tiered rotor tooth arrangements and flux paths are possible. Thus the rotor hub may hold more than one set and/or layers of rotor teeth, thereby giving rise to increased stator chuck arrangements and potentially complex flux paths. Additionally, stacking multiple embodiments of the invention end-to-end is possible as is typically done with existing SRM configurations.

In another aspect, the invention provides an electric machine that includes a rotor assembly comprising a plurality of rotor teeth disposed at least partially within the rotational plane and substantially in a circular path centered on the rotational axis of the machine. The electric machine also includes multiple stator chuck sets that each include a first stator chuck and a second stator chuck. The first stator chuck of each stator chuck set is disposed on an opposite side of the rotational plane from the second stator chuck. During operation of the electric machine, a portion of a flux path passes from the first stator chuck through a rotor tooth to the opposing second stator chuck.

In yet another aspect, the invention provides an electric machine comprising a rotor assembly, multiple stator chuck sets and a stator housing. The rotor assembly comprises a plurality of rotor teeth disposed at least partially within the rotational plane of the machine and substantially in a circular path centered on the rotational axis of the machine. Each stator chuck set comprises a first stator chuck and a second stator chuck disposed on opposite sides of the rotational plane from each other. The stator housing supports the stator chucks in fixed positions relative to the rotor assembly in such a manner that each stator chuck may be removed from the stator housing independently of each of the other stator chucks.

In general, the basic theory and analysis of the SRM of the present invention are similar to that of conventional SRM's. However, the revolved windings and other aspects of the invention provide better use of the three dimensional space thereby providing increased energy density. With increased energy density, the invention provides a motor that may be smaller and lighter in weight while still providing power and torque equivalent to much larger conventional motors.

Another advantage of the present invention is that it allows for enhanced maintainability of the motor. In the preferred embodiment, individual stator chucks/windings may be easily removed and replaced, thereby eliminating the necessity of completely rewinding the whole motor. Thus, repairs may be done with the motor in its operational position, thereby avoiding a long-term interruption in the motor operation. In fact, with sufficient controls and design considerations, it may be possible to repair the motor while it is operating. Motor performance may suffer somewhat during such a repair process, but the motor could continue to operate.

In traditional SRM's, acoustic noise can be a significant problem. One source of acoustic noise is aerodynamic turbulence introduced by the salient teeth moving through the air (windage). In the present invention, turbulence noise is significantly reduced because the aerodynamic profile of the rotor hub/housing can be made to match the profile of the tooth structure.

Another source of acoustic noise in traditional SRM's is planar loading due to high normal forces acting on the stator housing. In the traditional SRM design, during flux rise for each phase these normal forces act on opposing stator pole pairs which tends to "squeeze" the stator housing. During flux decline for each phase, the normal forces acting on the opposing pole pairs are reduced which allows the stator housing to "relax." This periodic squeezing and relaxing causes the stator housing to vibrate which adds to the acoustic noise. Unlike traditional SRM's, the loading of the stator housing of the present invention is primarily transverse to the plane of rotation so that the induced stresses do not traverse through the entire housing. This localizes the loading on the stator housing, thereby significantly reducing acoustic noise.

Another advantage of the present invention is that non-symmetric pole pairs are possible, (a pseudo half-arrangement or half-phase is possible) which could be used to increase the controllability of the motor during transitions between phases.

Also, the novel topology of the present invention could easily be incorporated into a linear SRM or VRM design. While the arrangements shown in the present invention have been configured such that they encircle a shaft, the transverse nature of torque production could easily be arranged in a linear or three dimensional spline path design.

This novel topology also has relevance to magnetically actuated vibrating equipment. Typically, vibrating equipment utilizes electromagnets to attract magnetically conductive material, either of which may be coupled to a load. The spacing between the electromagnets and magnetically conductive material is typically set prior to operation, and is done so based upon a known load range. Should the load decrease, the electromagnet may produce to much force causing disruption in the application and/or damage from contact between the electromagnet and magnetically conductive material. As this design surrounds and encloses the magnetically conductive material, longer, smoother strokes are possible and would not have to be spaced based upon existing loads.

Although the description of the invention focuses on preferred embodiments of a switched reluctance motor, it will be appreciated that various aspects of the invention also apply to switched reluctance generators as well as variable reluctance motors and generators. Thus, the novel topology of the invention is applicable generally to switched reluctance machines, variable reluctance machines, including motors and generators.

BRIEF DESCRIPTION OF THE DRAWINGS

Further advantages of the invention are made apparent by reference to the detailed description in conjunction with the figures, wherein elements are not to scale so as to more clearly show the details, wherein like reference numbers indicate like elements throughout the several views, and wherein:

FIGS. 1A, 1B and 1C depict a rotor assembly according to a preferred embodiment of the invention;

FIGS. 3A and 3B depict two configurations of a chuck set with phase windings according to a preferred embodiment of the invention;

FIGS. 4A, 4B, 5A and 5B depict a portion of a stator chuck arrangement surrounding a rotor assembly according to a preferred embodiment of the invention;

FIGS. 6A, 6B and 6C depict a stator chuck arrangement surrounding a rotor assembly according to a preferred embodiment of the invention;

FIGS. 10A and 10B depict perspective views of a motor assembly comprising three stator chuck arrangements surrounding a single rotor assembly according to a preferred embodiment of the invention;

FIGS. 17A and 17B depict an example of a conventional switched reluctance motor.

DETAILED DESCRIPTION

As shown in FIGS. 1A-1C, a preferred embodiment of the invention includes a rotor assembly 2 comprising a rotor hub 4 and multiple rotor teeth 6. The primary purpose of the rotor hub 4 is to hold the rotor teeth 6 and mechanically couple the rotor teeth 6 to a shaft. Because the path of the flux linkage of the preferred embodiment does not coincide with the plane of the rotor hub 4, the rotor hub 4 need not be electrically or magnetically conductive. Thus, the hub 4 may be formed from practically any material that provides the desired structural rigidity, such as, plastic, metal or composite materials. There may be multiple sets of rotor teeth 6 located at various spatial and angular offsets that are held fixed by the one or more rotor hubs 4. Therefore, the invention is not limited to any particular rotor tooth arrangement.

Figure 2B:
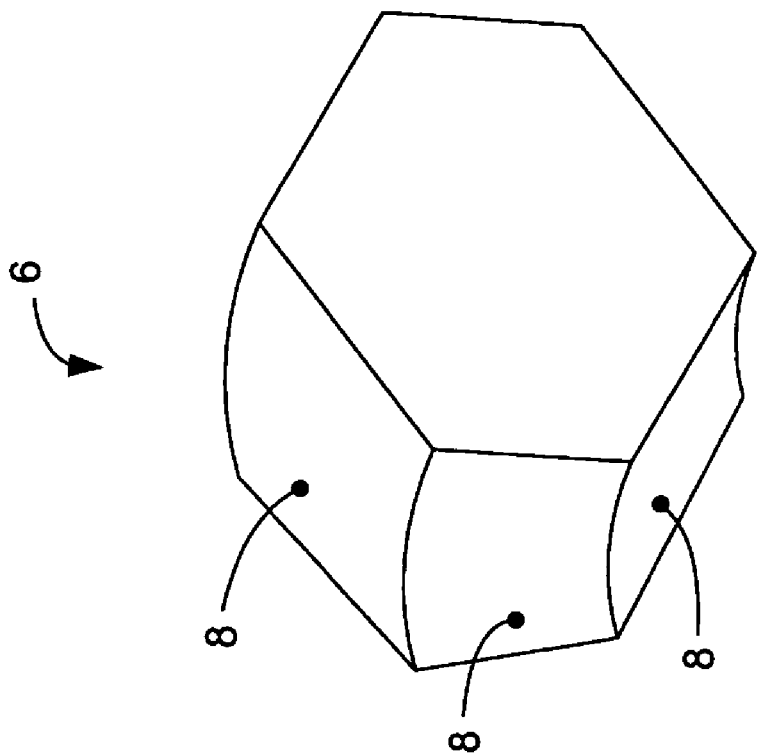
FIGS. 2A and 2B depict a rotor tooth according to a preferred embodiment of the invention.
Figure 2A:
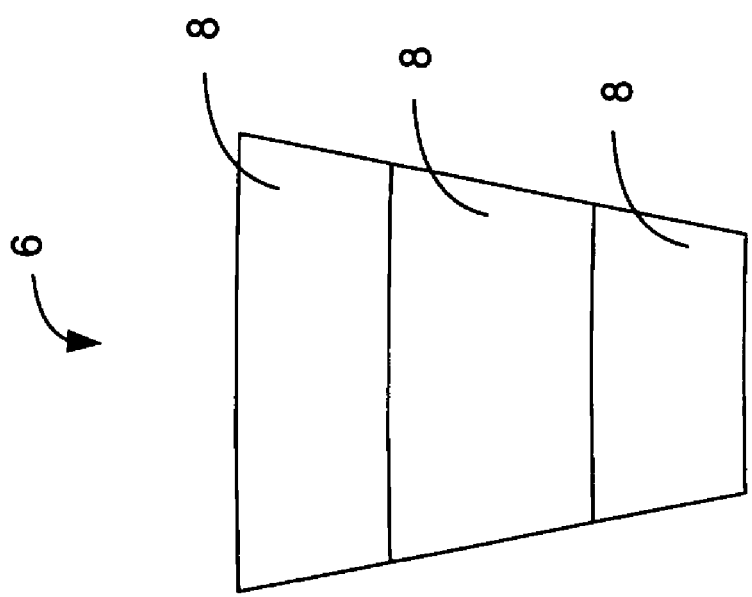
Figure 5B:
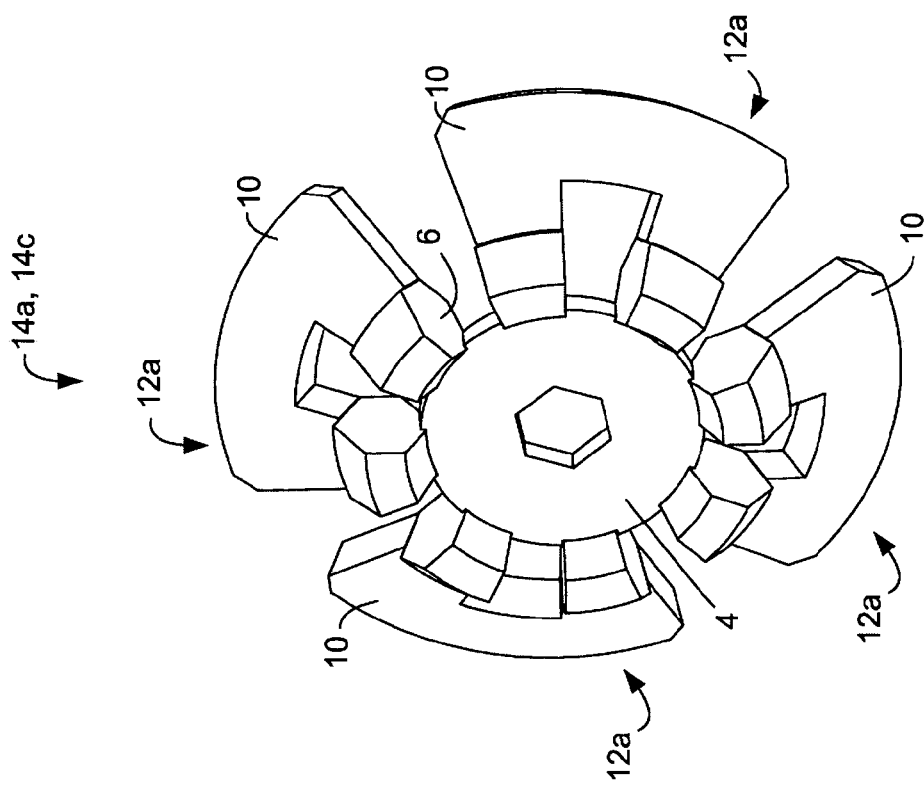
Figure 5A:
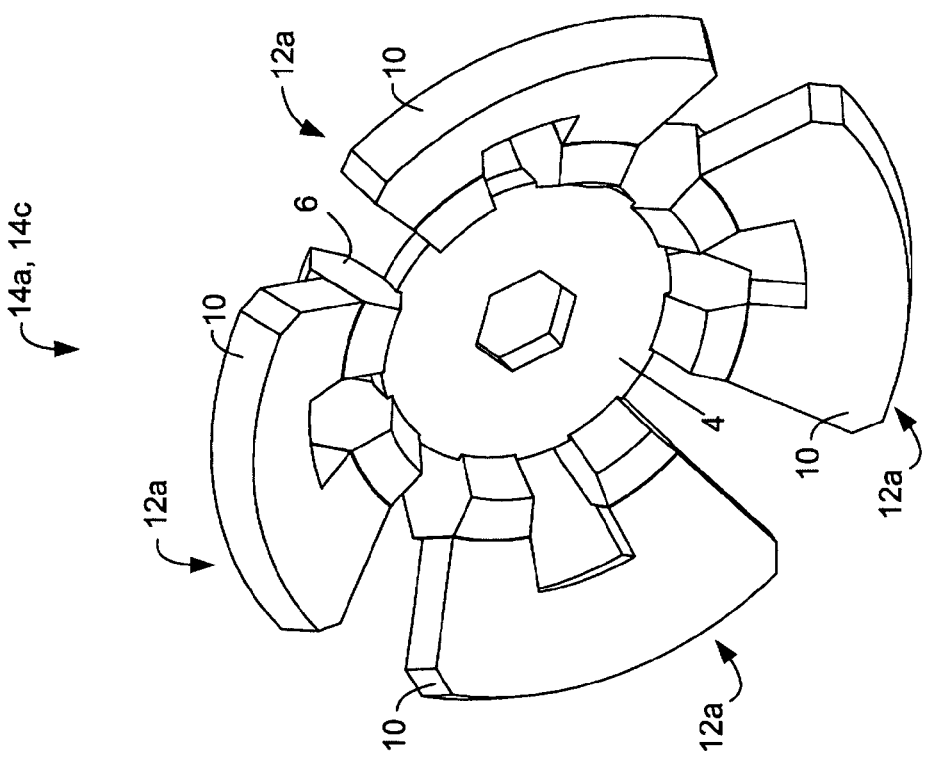
Figure 7C:
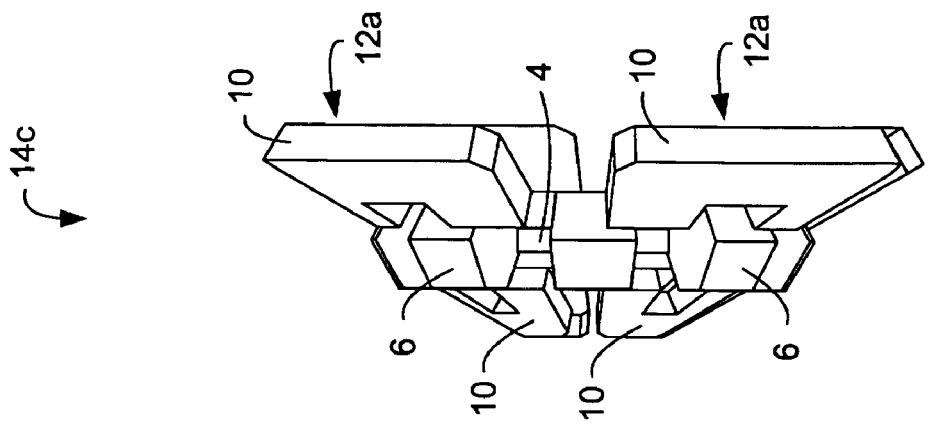
FIGS. 7A, 7B and 7C depict side views of three separate stator chuck arrangements, each surrounding a rotor assembly according to a preferred embodiment of the invention.
Figure 7B:
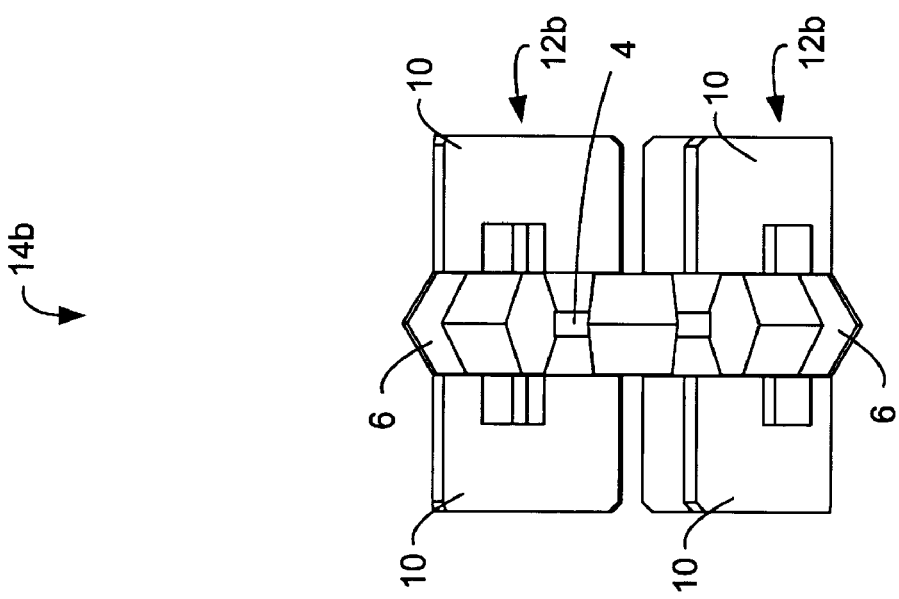
Figure 7A:
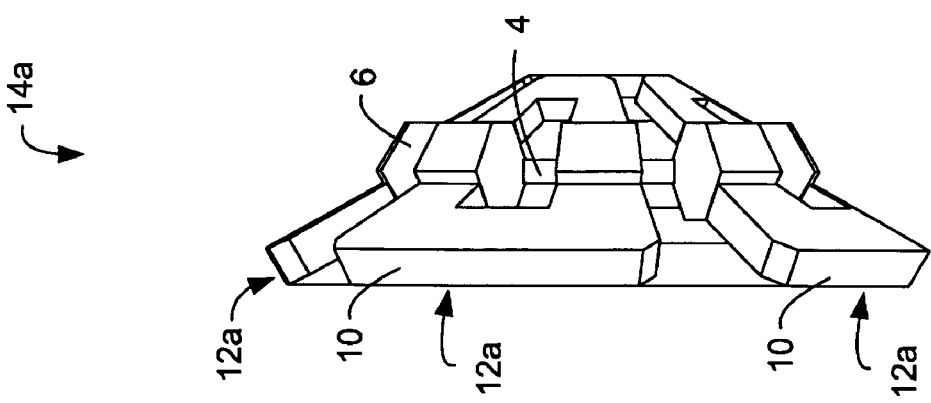
Figure 8C:
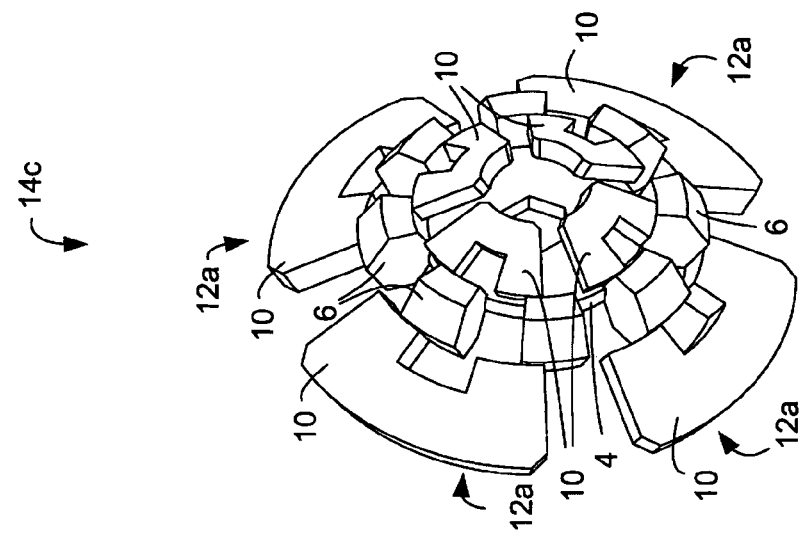
FIGS. 8A, 8B and 8C depict perspective views of three separate stator chuck arrangements, each surrounding a rotor assembly according to a preferred embodiment of the invention.
Figure 8B:
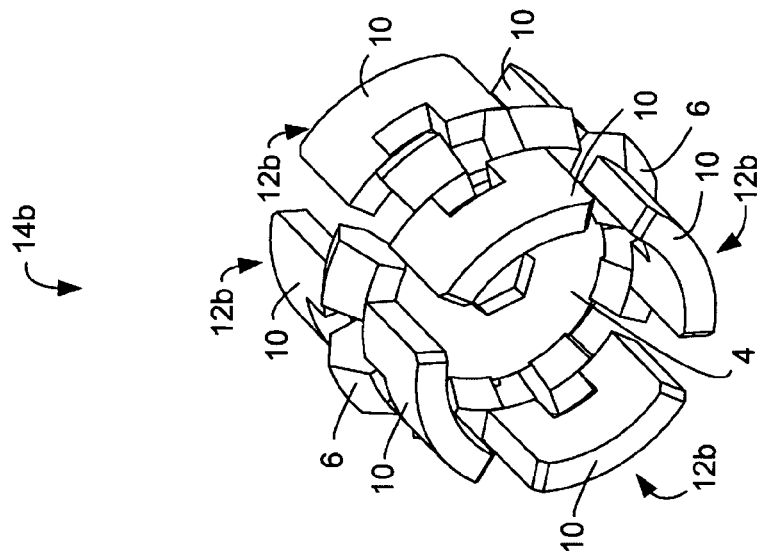
Figure 8A:
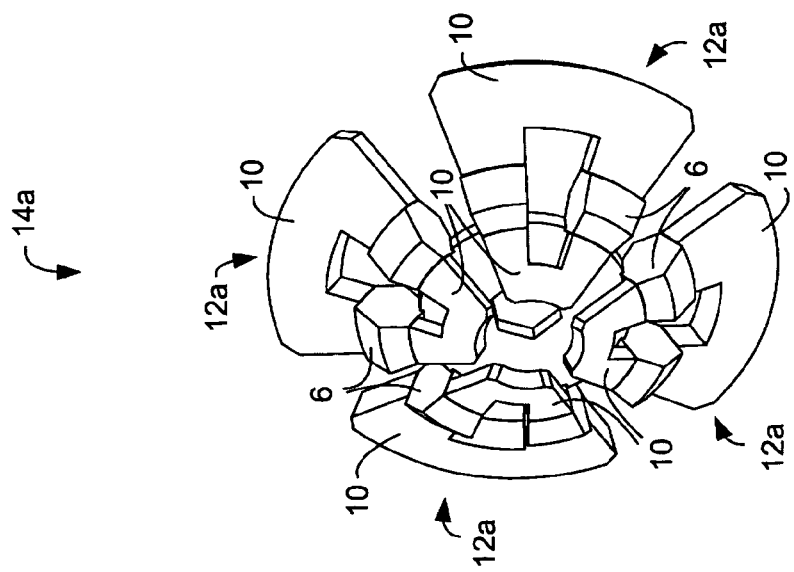
Figure 9B:
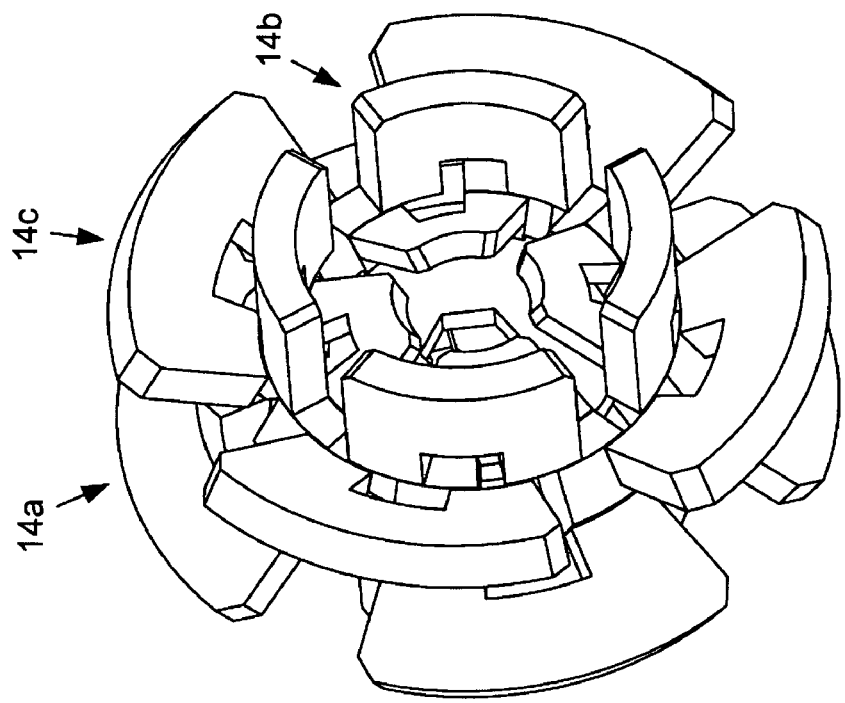
FIGS. 9A and 9B depict side and perspective views of a motor assembly comprising three stator chuck arrangements surrounding a single rotor assembly according to a preferred embodiment of the invention.
Figure 9A:
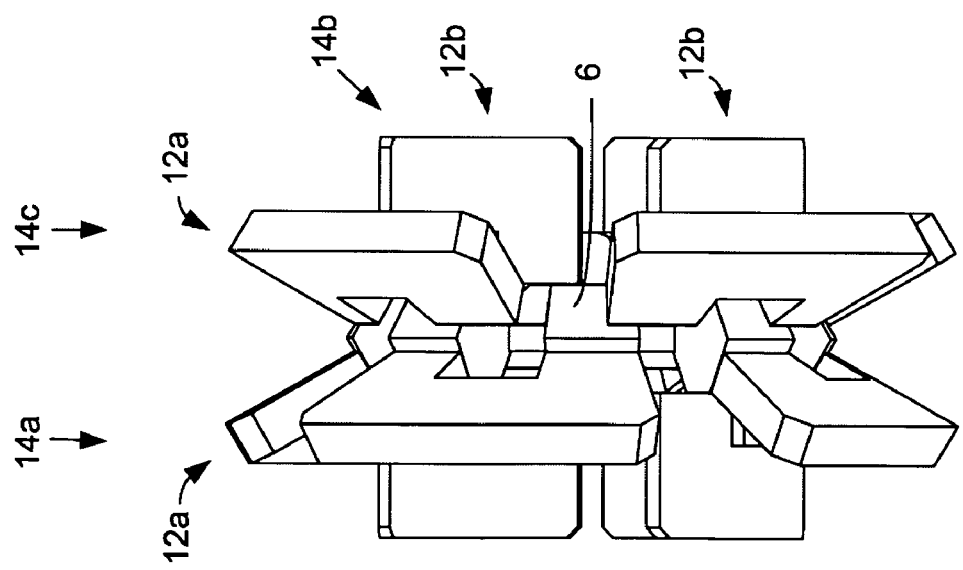

In the present invention, the flux linkages that produce the useful torque are made between a stator and the rotor teeth 6—not through a rotor yoke as is done in conventional SRM's. As shown in FIGS. 1A-1C, the rotor teeth 6 of the present invention are designed such that their spatial and angular offsets are symmetrical. As shown in FIGS. 2A and 2B, each tooth 6 may be described as a segment of a toroid. The outside surface of each rotor tooth 6 has a finite number of faces 8. In an alternative embodiment, the outer surfaces of the rotor teeth 6 are smooth, as with a typical toroidal shape.

FIGS. 3A-3B depict two configurations of stator chuck sets 12a and 12b which surround the rotor teeth 6. Each stator chuck set 12a, 12b comprises two opposing stator chucks 10. As shown in FIGS. 4A-4B, 5A-5B, 6A-6C, 7A-7C, 8A-8C, 9A-9B and 10A-10B, each of the stator chucks 10 is angularly and spatially offset from the rotor teeth 6 and from each of the other stator chucks 10. As shown in FIGS. 3A and 3B, each chuck 10 preferably includes a chuck center 10a and two chuck poles 10b. About the center 10a of each stator chuck 10 is secured a winding 11 or other flux production means. It will be appreciated that FIGS. 4A-4B and 5A-5B show only the outer (larger) of the chucks 10 of each chuck set 12a.

During operation of the motor, flux linkages develop between one or more chucks 10, through one or more rotor teeth 6, and into one or more opposing chucks 10. Thus, the stator chucks 10 are the primary conduit for the stator flux. The chuck poles 10b are profiled such that each pole has a face 10c-10d that is parallel to a corresponding rotor tooth face 8.

As shown in FIGS. 6A-6C, 7A-7C and 8A-8C, each stator chuck arrangement 14a, 14b, 14c consists of one or more complimentary chuck sets 12a-12b that enclose and surround the rotor teeth 6. Complimentary chuck sets 12a-12b in a chuck arrangement 14a, 14b, 14c need not be in parallel, nor do they need to be symmetrically located about the rotor teeth 6 or to other chucks sets 12a-12b. Additionally, complimentary chuck sets 12 may have an odd or even number of chucks 10.

In a preferred embodiment of the invention depicted in FIGS. 7A-7C and 8A-8C, the motor comprises three stator chuck arrangements 14a, 14b, 14c that are angularly offset and spatially offset from each other. The stator chuck arrangements 14a, 14b, 14c may or may not overlap other stator chuck arrangements 14a, 14b, 14c. Should they overlap, then during operation, direct flux linkage paths exist between the rotor teeth 6 and one or more of the stator chuck arrangements 14a, 14b, 14c. In addition, stator chuck arrangements 14 are angularly and spatially positioned such that flux through any stator chuck 10 may link through one or more rotor teeth 6. Although the preferred embodiment of the invention includes three stator chuck arrangements 14a, 14b, 14c, it should be appreciated that there may be more or fewer than three that may or may not overlap. Therefore, the invention is not limited to any particular number of stator chuck arrangements, or angular or spatial offsets.

FIGS. 9A-9B and 10A-10B depict all three stator chuck arrangements 14a, 14b, 14c enclosing and surrounding a single rotor assembly 2 with partial overlapping of the arrangements. In a preferred embodiment, the stator chuck arrangements 14a, 14b, 14c are held in place by means integrated into a stator housing 16, a preferred embodiment of which is depicted in FIGS. 13A-13F. The stator housing 16 is not depicted in FIGS. 9A and 9B and 10A-10B so that the chuck arrangements 14a, 14b, 14c may be clearly shown.

Unlike a traditional SRM design, the preferred embodiment of the stator housing 16 is not part of the primary flux path or part of any electrical conduction path. Thus, the stator housing 16 need only provide mechanical integrity in supporting the stator chuck arrangements and maintaining their locations with respect to the rotor assembly 2. Preferably, wires or traces for connection of stator chuck windings as well as desired control elements are integrated into the stator housing 16. The housing 16 may be formed from practically any material that provides the desired structural rigidity, such as plastic, metal or composite materials.

As flux linkage of sufficient magnitude is established between any one of the stator chuck arrangements (such as 14a) and the rotor teeth 6, the rotor teeth 6 will tend to align with the flux established between the opposing chuck poles 10b in the stator chuck arrangement 14a. Since the rotor teeth 6 are secured to the rotor hub 4, the alignment of the teeth 6 to the chuck poles 10b causes the rotor hub 4 to rotate. As the hub 4 rotates, the teeth 6 begin to align with the poles 10b of an adjacent stator chuck arrangement 14b which is angularly and spatially offset from the chuck arrangement 14a. (See FIGS. 10A-10B.) The adjacent stator chuck arrangement 14b then begins to establish new flux linkages as the flux linkages for the previous chuck arrangement 14a peak and begin to decay. This process of flux establishment, alignment of rotor teeth 6 and chuck poles 10b, flux decay and new flux establishment is repeated for continuous rotation and operation. Stator chuck sets 12a-12b work cooperatively within the stator chuck arrangements 14a, 14b, 14c. In this way, flux linkage is made successively from one stator chuck arrangement to another. Since the stator chuck arrangements 14a, 14b, 14c are positioned angularly and spatially around the rotor teeth 6, flux linkage, and thus torque generation, is made along a three-dimensional path surrounding the rotor teeth 6.

Figure 11B:
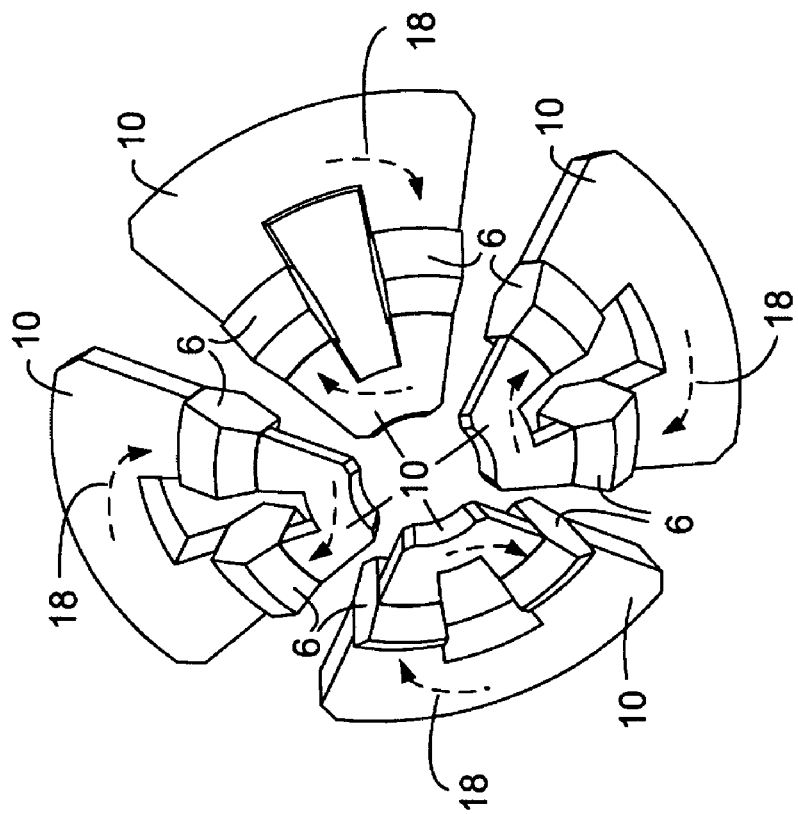
FIGS. 11A and 11B depict two views of a chuck arrangement surrounding a rotor assembly to provide a loop flux path according to a preferred embodiment of the invention.
Figure 11A:
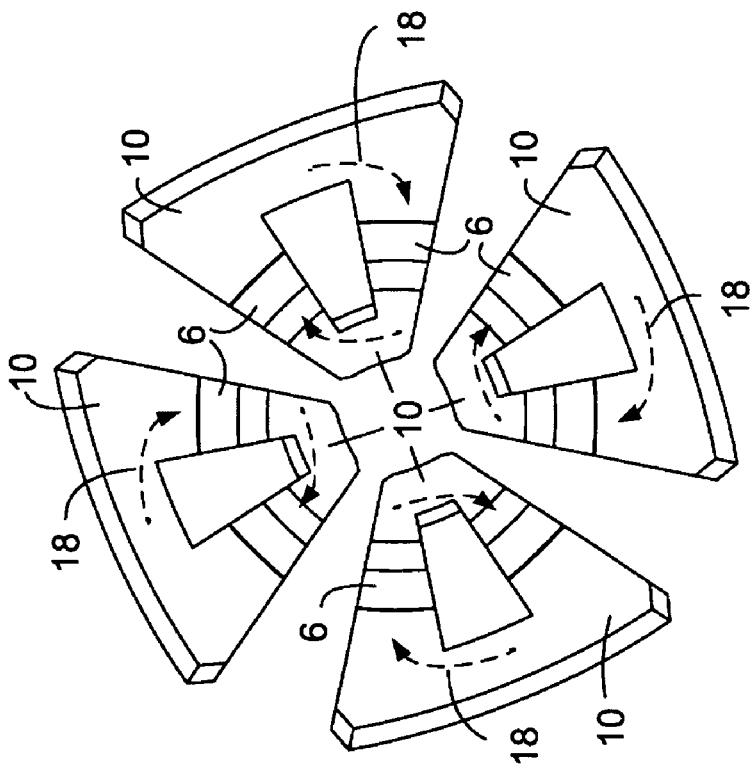

In an alternative embodiment of the invention, chuck arrangements 14a, 14b, 14c may have several different configurations. For example, FIGS. 1A and 1B show a "loop" configuration. In this configuration four separate flux paths 18 exist within each chuck arrangement 14 and the flux paths 18 are localized about four separate center points. In the configuration shown in FIGS. 11A and 11B, each flux path 18 involves two stator chucks 10 and two rotor teeth 6 per path. It will be appreciated that more or fewer than four flux paths per arrangement may exist in a loop configuration. Thus, the invention is not limited to any particular number of flux paths in a loop configuration.

Figure 14:
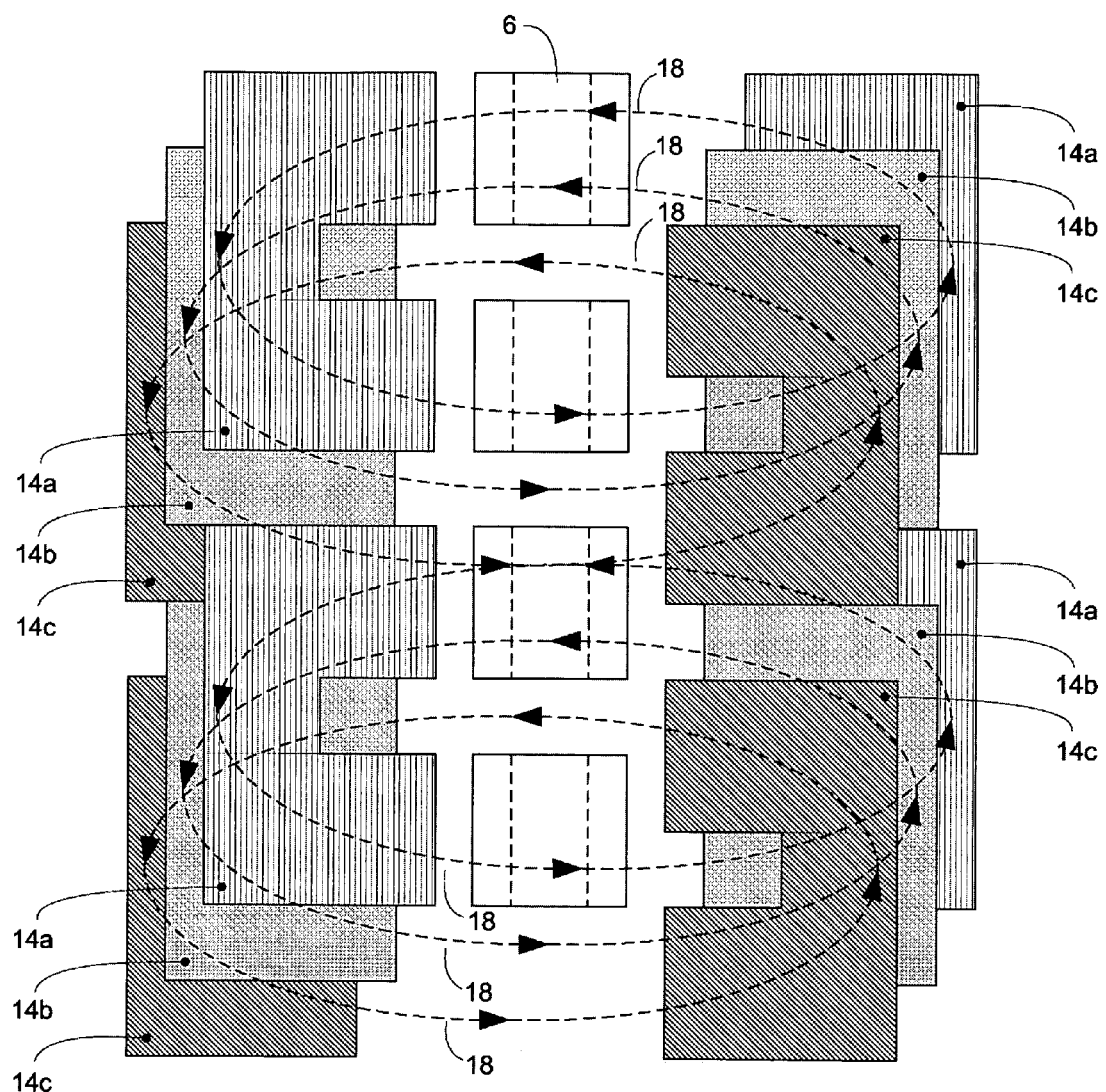
FIG. 14 depicts three chuck arrangements surrounding a rotor assembly to provide a loop flux path according to a preferred embodiment of the invention.

FIG. 14 depicts a plane view representation of the loop configuration showing the alignment pattern with partial overlapping and the multiple localized flux paths 18. Utilization of the loop configuration has advantages in applications requiring large load variations. With sufficient control capabilities, individual chuck set windings within an arrangement could be disengaged so that they no longer produce flux and thus torque. This allows other still operational chuck sets to continue operating at their peak efficiencies. With sufficient mechanical and control integration, the loop configuration also allows for the removal and replacement of a chuck set, possibly while the motor is still in operation. This ability to repair the motor without removal or total disassembly has significant advantages and benefits, such as maximized in-service time.

Figure 12B:
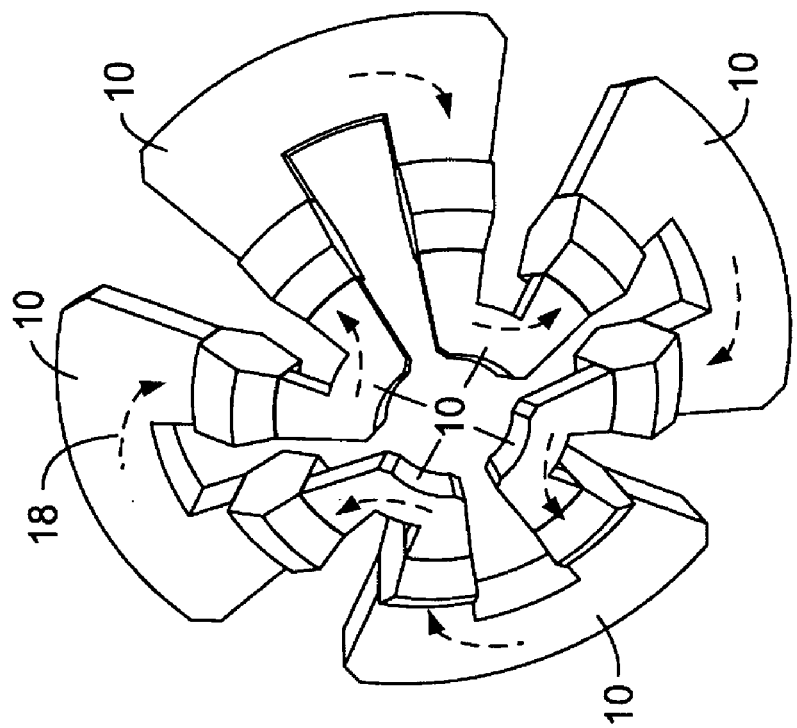
FIGS. 12A and 12B depict two views of a chuck arrangement surrounding a rotor assembly to provide a coupled flux path according to a preferred embodiment of the invention.
Figure 12A:
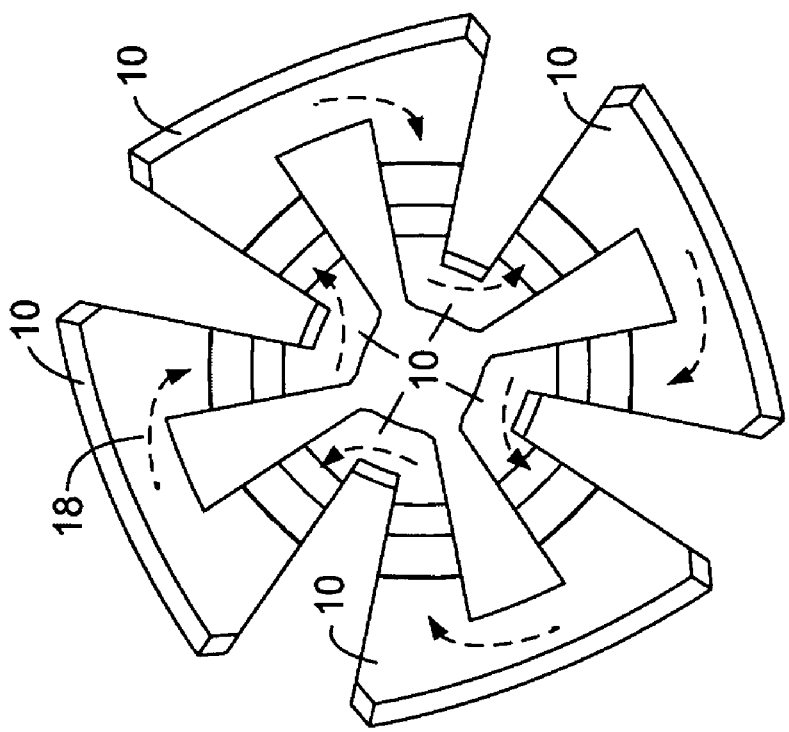
Figure 13B:
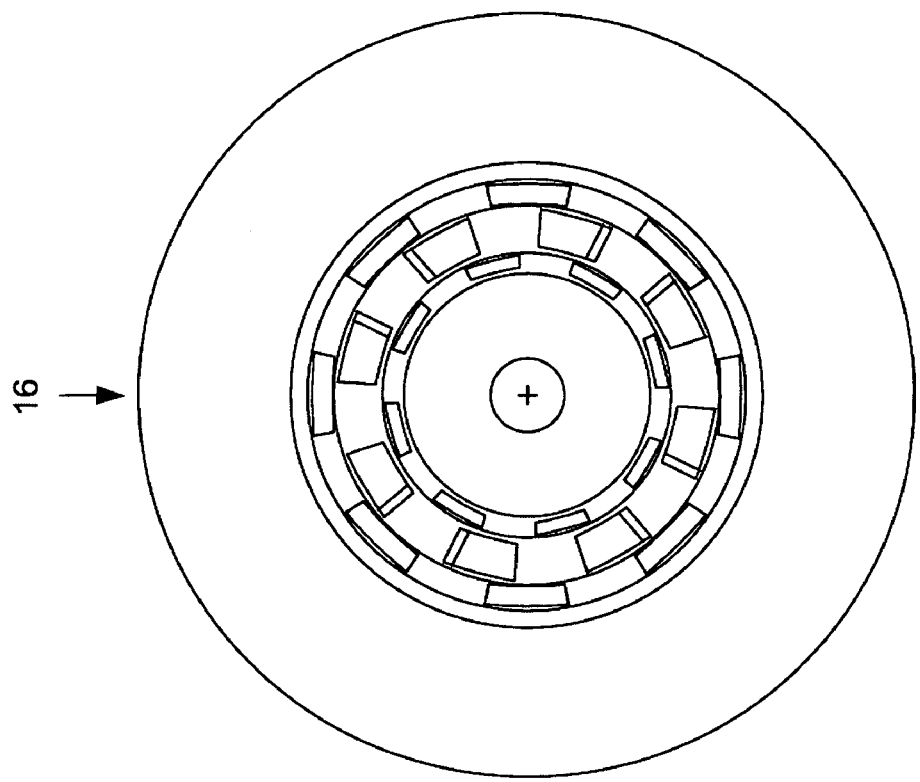
FIGS. 13A-13F depict various views of a stator housing according to a preferred embodiment of the invention.
Figure 13A:
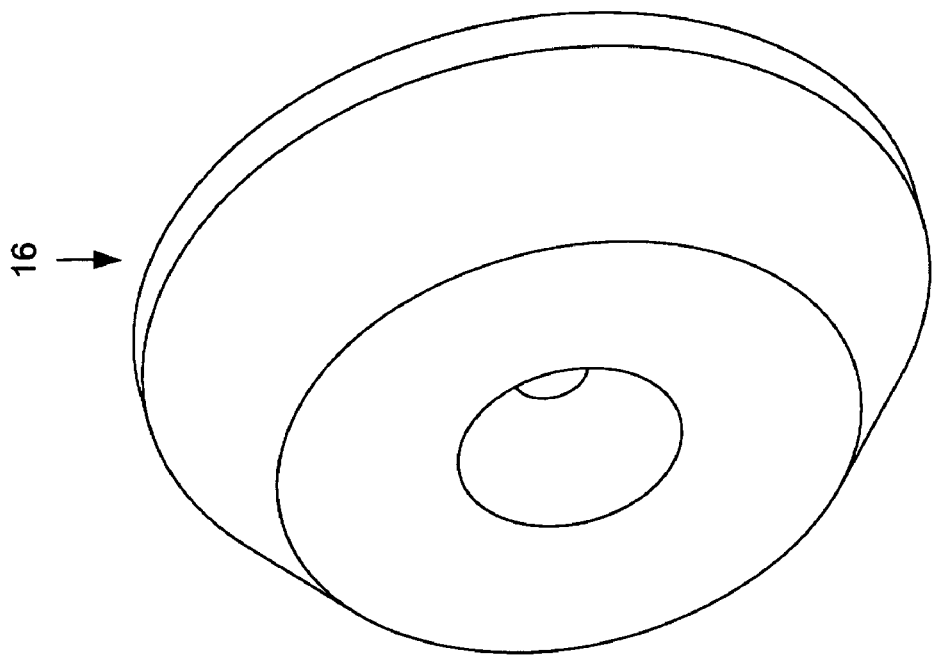
Figure 13D:
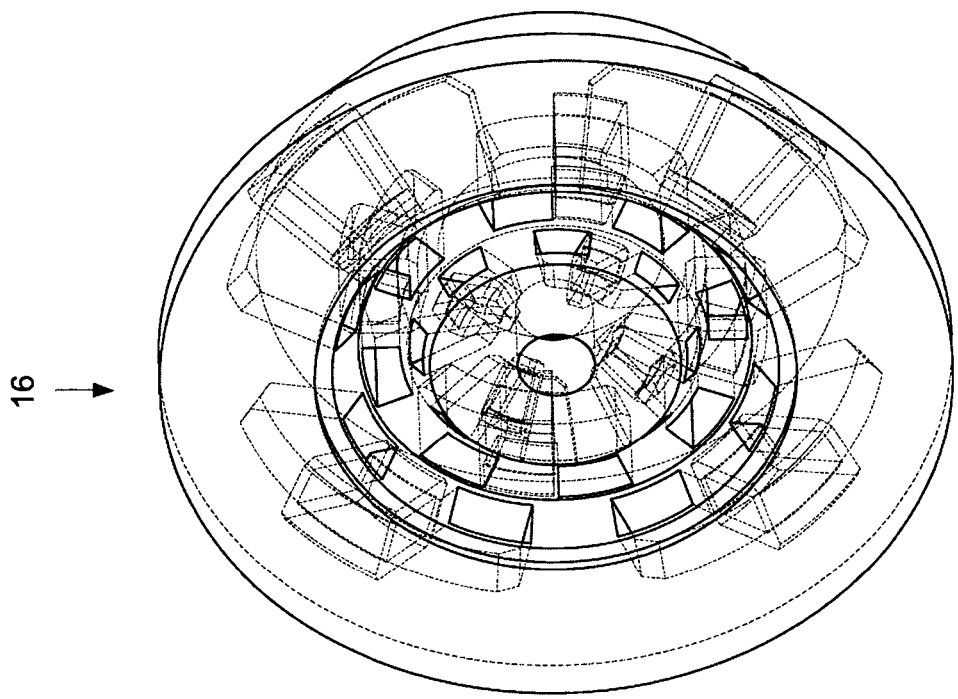
Figure 13C:
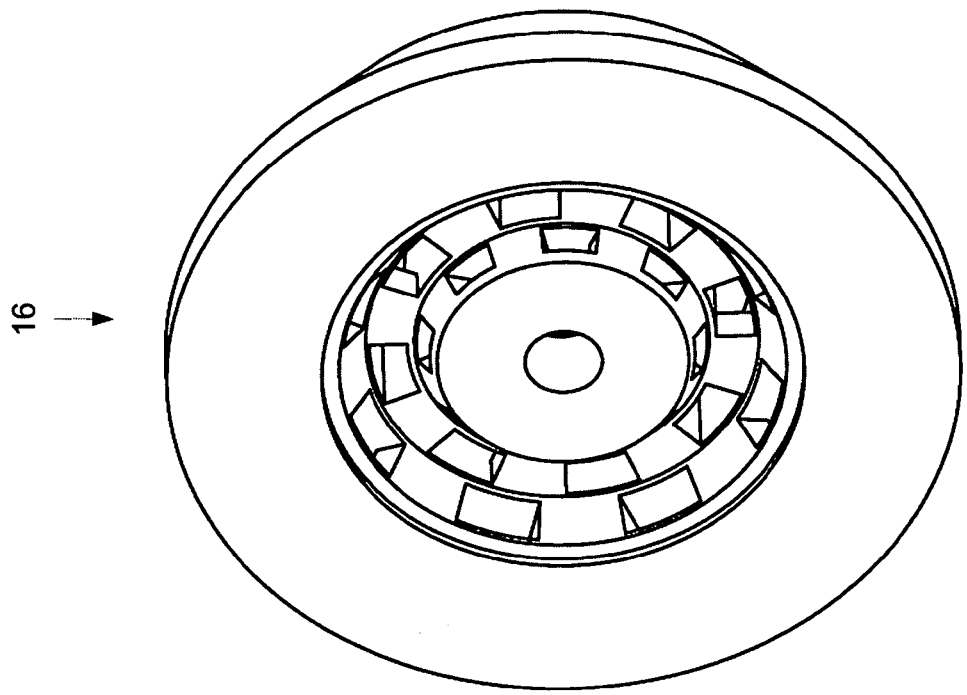
Figure 13F:
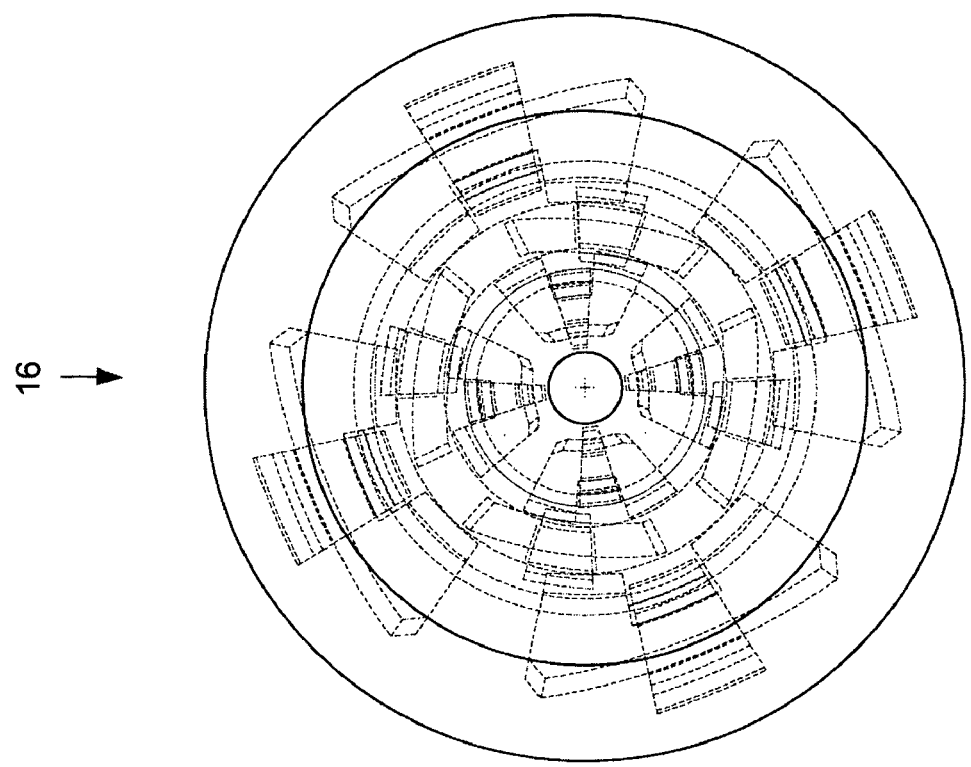
Figure 13E:
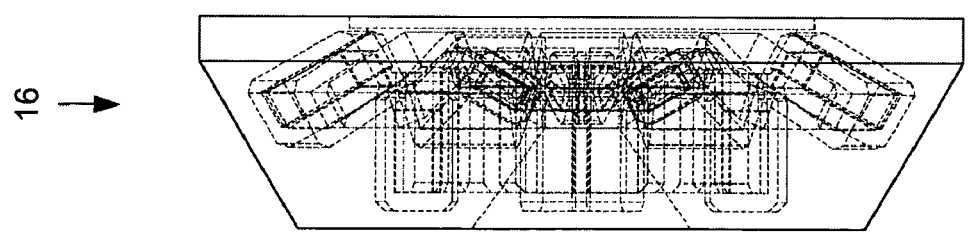
Figure 15:
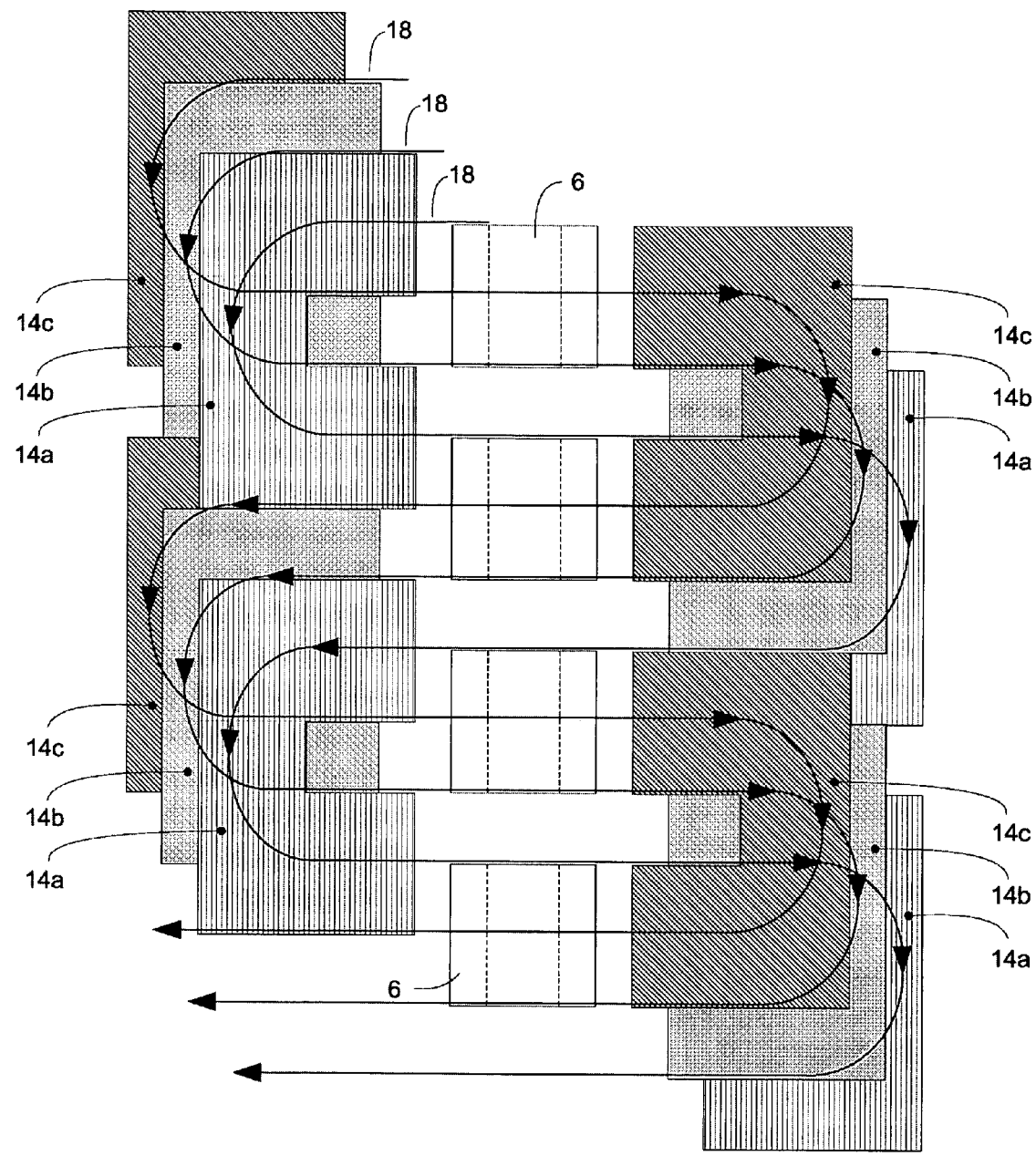
FIG. 15 depicts three chuck arrangements surrounding a rotor assembly to provide a coupled flux path according to a preferred embodiment of the invention.

FIGS. 12A-12B show a coupled configuration in which the flux flows through a single primary flux path 18 passing through all the chucks 10 and all the rotor teeth 6. FIG. 15 depicts a plane view representation of the coupled configuration showing the alignment pattern with partial overlapping and the single flux path 18 per chuck arrangement. The coupled configuration is beneficial in applications with relatively constant loading. Because the flux within a coupled arrangement is in series, a failure of one winding would result in marginal loss to the overall arrangement. Thus, with sufficient controls the remaining windings would need only increase their current level a nominal amount to return to the desired flux linkage magnitude. This would delay the need for immediate repair thereby allowing the motor to say in service longer.

It will be appreciated that some embodiments of the invention may comprise a combination of the loop and coupled configurations.

Figure 16:
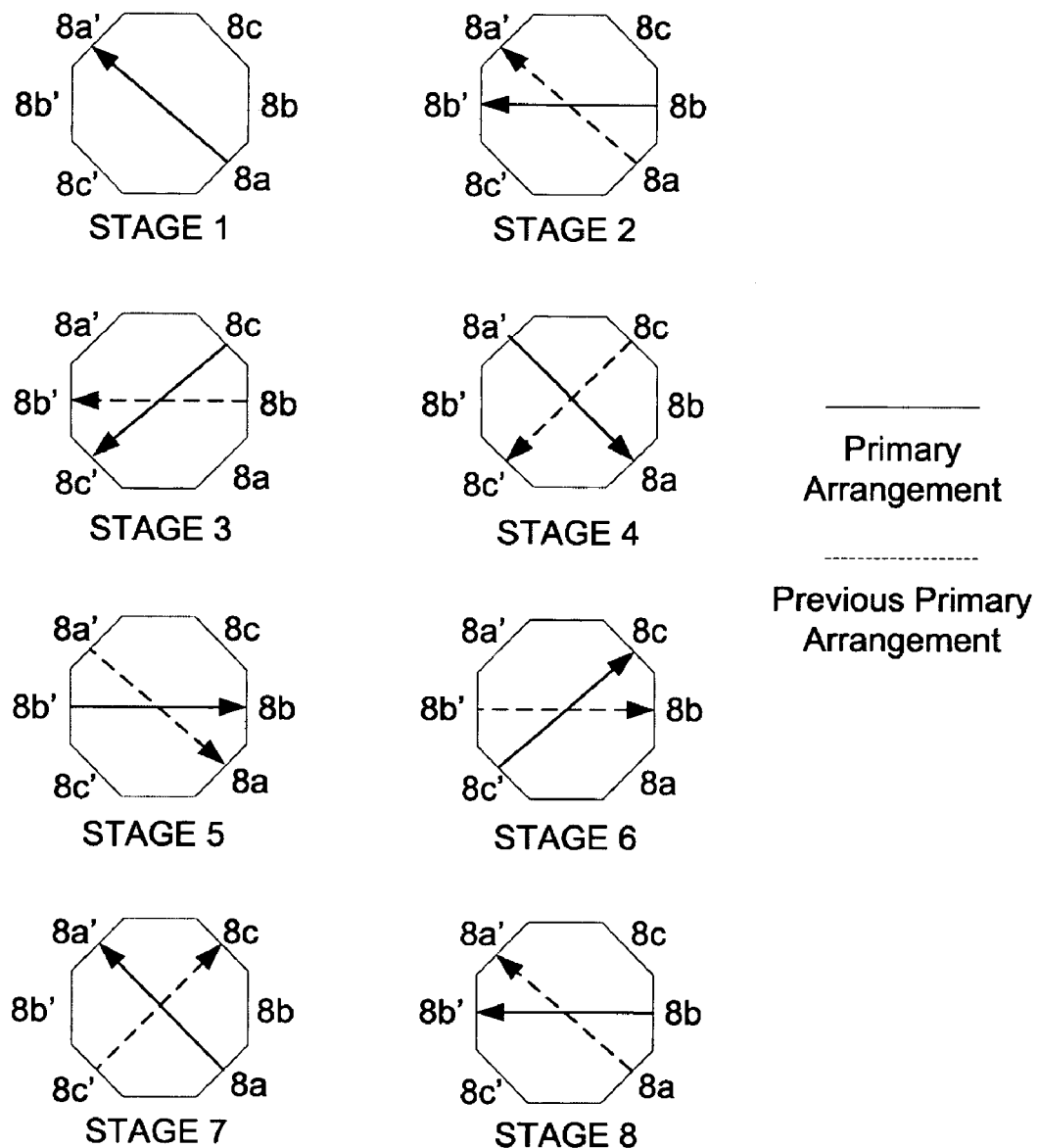
FIG. 16 depicts rotation of flux direction in a rotor tooth during operation of a switched reluctance machine having three chuck arrangements according to a preferred embodiment of the invention.

Many prior art schemes have a specific flux path passing within rotor teeth. However, the transverse nature of the flux paths of the present invention is such that the flux path through the rotor tooth is variable. Thus, the flux path may be in opposite directions for two different rotor positions or it may be angularly offset. For example, FIG. 16 depicts the sequential process of flux linkage initiation from one stator chuck arrangement to another during eight stages of operation of an SRM having three chuck arrangements. The arrows indicate the primary direction of the flux path within a stator tooth from one tooth face (such as 8a) to the opposing tooth face (such as 8a'). In the case of overlap of stator chuck arrangements, the previous chuck will have established flux linkage, such that any new flux linkage may result in significant mutual inductance. If there is little to no overlap, the previous primary arrangement may have little effect upon the developing linkages.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An electric machine having a rotational axis, the machine comprising:
   a rotor assembly comprising:
      a rotor hub disposed in a rotational plane that is substantially perpendicular to the rotational axis; and
      a plurality of rotor teeth affixed to the rotor hub, the rotor teeth disposed in a substantially circular path about the rotational axis, the rotor teeth including at least a first rotor tooth, a second rotor tooth and a third rotor tooth; and
   one or more stator chuck arrangements disposed around and adjacent the rotor assembly, each stator chuck arrangement comprising a plurality of stator chuck sets including at least a first stator chuck set and a second stator chuck set, each stator chuck set comprising at least a first stator chuck and a second stator chuck, the first and second stator chucks each having a first chuck pole, a second chuck pole and a chuck winding, the first and second chuck poles being disposed adjacent the rotor teeth as the rotor assembly rotates about the rotational axis,
   where during operation of the electric machine, a flux path passes from the first chuck pole of the first chuck of the first stator chuck set into the first rotor tooth, through the first rotor tooth and into the first chuck pole of the second stator chuck of the first stator chuck set, from the first chuck pole of the second stator chuck of the first stator chuck set to the second chuck pole of the second stator chuck of the first stator chuck set, and from the second chuck pole of the second stator chuck of the first stator chuck set into the second rotor tooth, where during operation the flux path further passes through the second rotor tooth and into the second chuck pole of a first stator chuck of the second stator chuck set, from the second chuck pole of the first stator chuck of the second stator chuck set to the first chuck pole of the first stator chuck of the second stator chuck set, and from the first chuck pole of the first stator chuck of the second stator chuck set into the third rotor tooth.

2. The electric machine of claim 1 wherein the stator chuck sets of at least one of the stator chuck arrangements are disposed in a substantially cylindrical relationship about the axis of rotation.

3. An electric machine having a rotational axis, the machine comprising:
- a rotor assembly comprising:
  - a rotor hub disposed in a rotational plane that is substantially perpendicular to the rotational axis; and
  - a plurality of rotor teeth affixed to the rotor hub, the rotor teeth disposed in a substantially circular path about the rotational axis, the rotor teeth including at least a first rotor tooth, a second rotor tooth and a third rotor tooth; and
- one or more stator chuck arrangements disposed around and adjacent the rotor assembly, each stator chuck arrangement comprising a plurality of stator chuck sets including at least a first stator chuck set and a second stator chuck set, each stator chuck set comprising at least a first stator chuck and a second stator chuck, the first and second stator chucks each having a first chuck pole, a second chuck pole and a chuck winding, the first and second chuck poles being disposed adjacent the rotor teeth as the rotor assembly rotates about the rotational axis,
- where during operation of the electric machine, a flux path passes from the first chuck pole of the first chuck of the first stator chuck set into the first rotor tooth, through the first rotor tooth and into the first chuck pole of the second stator chuck of the first stator chuck set, from the first chuck pole of the second stator chuck of the first stator chuck set to the second chuck pole of the second stator chuck of the first stator chuck set, and from the second chuck pole of the second stator chuck of the first stator chuck set into the second rotor tooth,
- wherein the stator chuck sets of at least one of the stator chuck arrangements are disposed in a substantially conical relationship about the axis of rotation.

4. The electric machine of claim 3 wherein one or more of the stator chuck sets comprise N number of stator chucks surrounding the rotor teeth, wherein each stator chuck is angularly offset from each adjacent stator chuck in the same stator chuck set by about $$\frac{360°}{N}.$$

5. The electric machine of claim 3 further comprising a stator housing for supporting the stator chucks in fixed positions relative to the rotor assembly, whereby each of the stator chucks may be removed from the stator housing independently of each of the other stator chucks.

6. The electric machine of claim 5 wherein the stator housing includes a plurality of slots for receiving the first and second stator chucks therein.

7. The electric machine of claim 5 wherein the stator housing further comprises a first housing half and a second housing half that is separable from the first housing half, the first housing half for supporting the first stator chucks in fixed positions relative to the rotor assembly, and the second housing half for supporting the second stator chucks in fixed positions relative to the rotor assembly.

8. An electric machine having a rotational axis, the machine comprising:
- a rotor assembly comprising:
  - a rotor hub disposed in a rotational plane that is substantially perpendicular to the rotational axis; and
  - a plurality of rotor teeth affixed to the rotor hub, the rotor teeth disposed in a substantially circular path about the rotational axis, the rotor teeth including at least a first rotor tooth, a second rotor tooth and a third rotor tooth; and
- one or more stator chuck arrangements disposed around and adjacent the rotor assembly, each stator chuck arrangement comprising a plurality of stator chuck sets including at least a first stator chuck set and a second stator chuck set, each stator chuck set comprising at least a first stator chuck and a second stator chuck, the first and second stator chucks each having a first chuck pole, a second chuck pole and a chuck winding, the first and second chuck poles being disposed adjacent the rotor teeth as the rotor assembly rotates about the rotational axis,
- wherein at least one of the stator chuck arrangements comprise stator chucks that are all disposed on the same side of the rotational plane for assisting other of the stator chuck arrangements in flux guidance,
- where during operation of the electric machine, a flux path passes from the first chuck pole of the first chuck of the first stator chuck set into the first rotor tooth, through the first rotor tooth and into the first chuck pole of the second stator chuck of the first stator chuck set, from the first chuck pole of the second stator chuck of the first stator chuck set to the second chuck pole of the second stator chuck of the first stator chuck set, and from the second chuck pole of the second stator chuck of the first stator chuck set into the second rotor tooth.

9. An electric machine having a rotational axis, the machine comprising:
- a rotor assembly comprising:
  - a rotor hub disposed in a rotational plane that is substantially perpendicular to the rotational axis; and
  - a plurality of rotor teeth affixed to the rotor hub, the rotor teeth disposed in a substantially circular path about the rotational axis, the rotor teeth including at least a first rotor tooth, a second rotor tooth and a third rotor tooth; and
- one or more stator chuck arrangements disposed around and adjacent the rotor assembly, each stator chuck arrangement comprising a plurality of stator chuck sets including at least a first stator chuck set and a second stator chuck set, each stator chuck set comprising at least a first stator chuck and a second stator chuck, the first and second stator chucks each having a first chuck pole, a second chuck pole and a chuck winding, the first and second chuck poles being disposed adjacent the rotor teeth as the rotor assembly rotates about the rotational axis,
- where during operation of the electric machine, a flux path passes from the first chuck pole of the first chuck of the first stator chuck set into the first rotor tooth, through the first rotor tooth and into the first chuck pole of the second stator chuck of the first stator chuck set, from the first chuck pole of the second stator chuck of the first stator chuck set to the second chuck pole of the second stator chuck of the first stator chuck set, and from the second chuck pole of the second stator chuck of the first stator chuck set into the second rotor tooth, wherein the one or more stator chuck arrangements comprise at least a first stator chuck arrangement comprising stator chuck sets disposed in a substantially cylindrical relationship about the axis of rotation, and a second stator chuck arrangement comprising stator chuck sets disposed in a substantially conical relationship about the axis of rotation.

10. An electric machine having a rotational axis, the machine comprising:
- a rotor assembly comprising:
  - a rotor hub disposed in a rotational plane that is substantially perpendicular to the rotational axis; and
  - a plurality of rotor teeth affixed to the rotor hub, the rotor teeth disposed in a substantially circular path about the rotational axis, the rotor teeth including at least a first rotor tooth, a second rotor tooth and a third rotor tooth, wherein each of the rotor teeth has at least four faces comprising at least two opposing first faces and two opposing second faces; and
- one or more stator chuck arrangements disposed around and adjacent the rotor assembly, each stator chuck arrangement including a plurality of stator chuck sets including at least a first stator chuck set and a second stator chuck set, each stator chuck set comprising at least a first stator chuck and a second stator chuck, the first and second stator chucks each having a first chuck pole, a second chuck pole and a chuck winding, the first and second chuck poles being disposed adjacent the rotor teeth as the rotor assembly rotates about the rotational axis,
  - wherein the one or more stator chuck arrangements further comprise:
  - a first stator chuck arrangement comprising stator chuck sets disposed in a substantially cylindrical relationship about the axis of rotation, and having chuck poles that are adjacent the first faces of the rotor teeth; and
  - a second stator chuck arrangement comprising stator chuck sets disposed in a substantially conical relationship about the axis of rotation, and having chuck poles that are adjacent the second faces of the rotor teeth,
  - where during operation of the electric machine, a flux path passes from the first chuck pole of the first chuck of the first stator chuck set into the first rotor tooth, through the first rotor tooth and into the first chuck pole of the second stator chuck of the first stator chuck set, from the first chuck pole of the second stator chuck of the first stator chuck set to the second chuck pole of the second stator chuck of the first stator chuck set, and from the second chuck pole of the second stator chuck of the first stator chuck set into the second rotor tooth.

11. The electric machine of claim 10 wherein the rotor hub is formed of a nonmetallic material.

12. The electric machine of claim 11 wherein the rotor hub is formed of plastic.

13. An electric machine having a rotational plane perpendicular to a rotational axis, the machine comprising:
- a rotor assembly comprising a plurality of rotor teeth disposed in one or more substantially concentric circles that are substantially centered on the rotational axis of the machine, the rotor teeth including at least a first rotor tooth, a second rotor tooth and a third rotor tooth; and
- a plurality of stator chuck sets each comprising at least two stator chucks disposed adjacent the rotor teeth as the rotor assembly rotates about the rotational axis, the stator chuck sets including at least a first stator chuck set and a second stator chuck set, each stator chuck set comprising at least a first stator chuck and a second stator chuck, the first and second stator chucks each having a first chuck pole, a second chuck pole and a chuck winding, the first and second chuck poles disposed adjacent the rotor teeth as the rotor assembly rotates about the rotational axis,
- wherein during operation of the electric machine, a portion of a flux path passes from the first chuck pole of the first chuck of the first stator chuck set into the first rotor tooth, through the first rotor tooth and into the first chuck pole of the second stator chuck of the first stator chuck set, from the first chuck pole of the second stator chuck of the first stator chuck set and into the second chuck pole of the second stator chuck of the first stator chuck set, and from the second chuck pole of the second stator chuck of the first stator chuck set and into the second rotor tooth, through the second rotor tooth and into the second chuck pole of the first stator chuck of the first stator chuck set, and from the second chuck pole of the first stator chuck of the first stator chuck set and into the first chuck pole of the first stator chuck of the first stator chuck set.

14. An electric machine having a rotational plane perpendicular to a rotational axis, the machine comprising:
- a rotor assembly comprising a plurality of rotor teeth disposed in one or more substantially concentric circles that are substantially centered on the rotational axis of the machine, the rotor teeth including at least a first rotor tooth, a second rotor tooth and a third rotor tooth; and
- a plurality of stator chuck sets each comprising at least two stator chucks disposed adjacent the rotor teeth as the rotor assembly rotates about the rotational axis, the stator chuck sets including at least a first stator chuck set and a second stator chuck set, each stator chuck set comprising at least a first stator chuck and a second stator chuck, the first and second stator chucks each having a first chuck pole, a second chuck pole and a chuck winding, the first and second chuck poles disposed adjacent the rotor teeth as the rotor assembly rotates about the rotational axis,
- wherein during operation of the electric machine, a portion of a flux path passes from the first chuck pole of the first chuck of the first stator chuck set into the first rotor tooth, through the first rotor tooth and into the first chuck pole of the second stator chuck of the first stator chuck set, from the first chuck pole of the second stator chuck of the first stator chuck set and into the second chuck pole of the second stator chuck of the first stator chuck set, and from the second chuck pole of the second stator chuck of the first stator chuck set and into the second rotor tooth, through the second rotor tooth and into the second chuck pole of a first stator chuck of the second stator chuck set, from the second chuck pole of the first stator chuck of the second stator chuck set to the first chuck pole of the first stator chuck of the second stator chuck set, and from the first chuck pole of the first stator chuck of the second stator chuck set into the third rotor tooth.

15. The electric machine of claim 14 wherein a portion of the flux path is transverse to the rotational plane.

16. The electric machine of claim 14 wherein a portion of the flux path is perpendicular to the rotational plane.

17. The electric machine of claim 14 wherein a portion of the flux path is parallel to the rotational plane.

18. An electric machine having a rotational plane perpendicular to a rotational axis, the machine comprising:

a rotor assembly comprising a plurality of rotor teeth disposed in one or more substantially concentric circles that are substantially centered on the rotational axis of the machine, wherein each of the rotor teeth has at least four faces comprising at least two opposing first faces and two opposing second faces; and a plurality of stator chuck sets each comprising at least two stator chucks disposed adjacent the rotor teeth as the rotor assembly rotates about the rotational axis, wherein during operation of the electric machine, a portion of a flux path passes from one of the at least two stator chucks through a rotor tooth to the other of the at least two stator chucks, and wherein the stator chuck sets are disposed in a plurality of stator chuck arrangements including:

a first stator chuck arrangement comprising stator chuck sets disposed in a substantially cylindrical relationship about the axis of rotation, and having chuck poles that are adjacent the first faces of the rotor teeth; and a second stator chuck arrangement comprising stator chuck sets disposed in a substantially conical relationship about the axis of rotation, and having chuck poles that are adjacent the second faces of the rotor teeth.

19. An electric machine having a rotational plane perpendicular to a rotational axis, the machine comprising:

a rotor assembly comprising a plurality of rotor teeth disposed in one or more substantially concentric circles that are substantially centered on the rotational axis of the machine; and a plurality of stator chuck sets each comprising at least two stator chucks disposed adjacent the rotor teeth as the rotor assembly rotates about the rotational axis, wherein during operation of the electric machine, a portion of a flux path passes from one of the at least two stator chucks through a rotor tooth to the other of the at least two stator chucks, wherein the stator chuck sets are disposed in a plurality of stator chuck arrangements and wherein at least one of the stator chuck arrangements comprises stator chucks that are all disposed on the same side of the rotational plane for assisting other of the stator chuck arrangements in flux guidance.

20. The electric machine of claim 19 further comprising a stator housing for supporting the stator chucks in fixed positions relative to the rotor assembly, whereby each of the stator chucks may be removed from the stator housing independently of each of the other stator chucks.

21. The electric machine of claim 20 wherein the stator housing includes a plurality of slots for receiving the stator chucks therein.

* * * * *